US011947311B2

(12) United States Patent
Shimadu et al.

(10) Patent No.: US 11,947,311 B2
(45) Date of Patent: Apr. 2, 2024

(54) IMAGE FORMING APPARATUS

(71) Applicant: BROTHER KOGYO KABUSHIKI KAISHA, Nagoya (JP)

(72) Inventors: Michihiro Shimadu, Toyota (JP); Yusuke Okabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/813,688

(22) Filed: Jul. 20, 2022

(65) Prior Publication Data

US 2023/0029862 A1 Feb. 2, 2023

(30) Foreign Application Priority Data

Jul. 30, 2021 (JP) ................................ 2021-125543
Apr. 1, 2022 (JP) ................................ 2022-061601

(51) Int. Cl.
*G03G 21/20* (2006.01)
*G03G 15/00* (2006.01)

(52) U.S. Cl.
CPC ........... *G03G 21/206* (2013.01); *G03G 15/50* (2013.01); *G03G 21/203* (2013.01)

(58) Field of Classification Search
None
See application file for complete search history.

(56) References Cited

U.S. PATENT DOCUMENTS 4,903,072 A * 2/1990 Iwata .................. G03G 21/206 355/30
5,095,333 A * 3/1992 Shimada ............. G03G 21/206 399/92
2003/0219274 A1* 11/2003 Hirose ................ G03G 21/206 399/92
2005/0105929 A1* 5/2005 Chae ................. G03G 15/2039 399/92
2013/0084092 A1* 4/2013 Ooyanagi .......... G03G 15/2039 399/69

(Continued)

FOREIGN PATENT DOCUMENTS

JP 2004013015 A 1/2004
JP 2006163143 A 6/2006

(Continued)

*Primary Examiner* — Sevan A Aydin
(74) *Attorney, Agent, or Firm* — Scully, Scott, Murphy & Presser, PC

(57) ABSTRACT

An image forming apparatus, having a main body housing including an air outlet opening, a photosensitive drum, a fuser to thermally fix toner transferred from the photosensitive drum to a sheet on the sheet, a fan to generate an airflow toward the air outlet opening, and a controller, is provided. The controller is configured to, in a continuous stage of printing continuous from a beginning stage, count a cumulative printed page number being a cumulative number of pages printed by the image forming apparatus, in a case where the cumulative printed page number is smaller than a first page number, control the fan to rotate at a first speed, and in a case where the cumulative printed page number is equal to or larger than the first page number, control the fan to rotate at a second speed, the second speed being higher than the first speed.

12 Claims, 16 Drawing Sheets

(56) References Cited

U.S. PATENT DOCUMENTS

| | | | | |
|---|---|---|---|---|
| 2013/0188978 | A1* | 7/2013 | Takeuchi ........... | G03G 15/2017 399/329 |
| 2014/0056608 | A1* | 2/2014 | Miura ................ | G03G 15/2039 399/92 |
| 2014/0126925 | A1* | 5/2014 | Ueno ................... | G03G 21/206 399/92 |
| 2015/0037055 | A1* | 2/2015 | Kitagawa ............. | G03G 15/205 399/68 |
| 2017/0153595 | A1* | 6/2017 | Nakachi ................. | G03G 21/10 |
| 2019/0354068 | A1 | 11/2019 | Funaba | |
| 2021/0072696 | A1 | 3/2021 | Abe et al. | |
| 2022/0091546 | A1* | 3/2022 | Saitoh ................ | G03G 15/2064 |

FOREIGN PATENT DOCUMENTS

| | | | |
|---|---|---|---|
| JP | 2009204935 | A | 9/2009 |
| JP | 2014044238 | A | 3/2014 |
| JP | 2014081576 | A | 5/2014 |
| JP | 2015087466 | A | 5/2015 |
| JP | 2016191807 | A | 11/2016 |
| JP | 2019198995 | A | 11/2019 |
| JP | 2021043332 | A | 3/2021 |

* cited by examiner

IMAGE FORMING APPARATUS

REFERENCE TO RELATED APPLICATIONS

This application claims priority from Japanese Patent Applications No. 2021-125543, filed on Jul. 30, 2021, and No. 2022-061601, filed on Apr. 1, 2022. The entire contents of the priority applications are incorporated herein by reference.

BACKGROUND

An image forming apparatus having a housing, a photosensitive drum, a fuser including a heater, and a fan to discharge air in the housing outward from the housing, is known.

The fuser may thermally fix a developing agent on a sheet with the heat from the heater. The heater may increase temperature inside the housing, and the fan may be operated to restrain the temperature from rising excessively. The temperature inside the housing may be detected by a thermistor, and the image forming apparatus may control behaviors of the fan to generate airflows in the housing as the temperature detected by the thermistor changes.

When the temperature inside the housing is lower than an atmosphere temperature outside the housing, moisture entering the housing may condense on a surface of the photosensitive drum. In order to restrain such condensation due to the moisture from the outside, the image forming apparatus may print without operating the fan until the temperature inside the housing increases and a difference between the atmosphere temperature and a temperature of the photosensitive drum is reduced.

DESCRIPTION

Meanwhile, as a sheet is heated by the fuser, moisture contained in the sheet may be vaporized to generate water vapor. Therefore, while the image forming apparatus continues printing without operating the fan, relative humidity inside the housing may increase excessively due to the internally generated water vapor from the sheet. Under the humidity condition with the increased relative humidity, if the fan that has not been operating starts operating, the air containing the moisture may touch the surface of the photosensitive drum, and the moisture may condense on the surface of the photosensitive drum.

Moreover, an amount of the airflow that may be generated in the image forming apparatus may vary depending on an ability of the fan. Therefore, if the thermistor is installed inside a main frame that enhances the housing of the image forming apparatus, performance of the thermistor may be affected by the variable airflow amount. In this regard, the image forming apparatus may find a difficulty that the temperature detected by the thermistor may not be dependable to control the fan correctly.

The present disclosure is advantageous in that an image forming apparatus, in which moisture condensation on a surface of a photosensitive drum may be restrained, and in which a fan may be controlled preferably regardless of ability of the fan, is provided.

I. First Embodiment

1. Overall Configuration of Image Forming Apparatus 1

Figure 1:
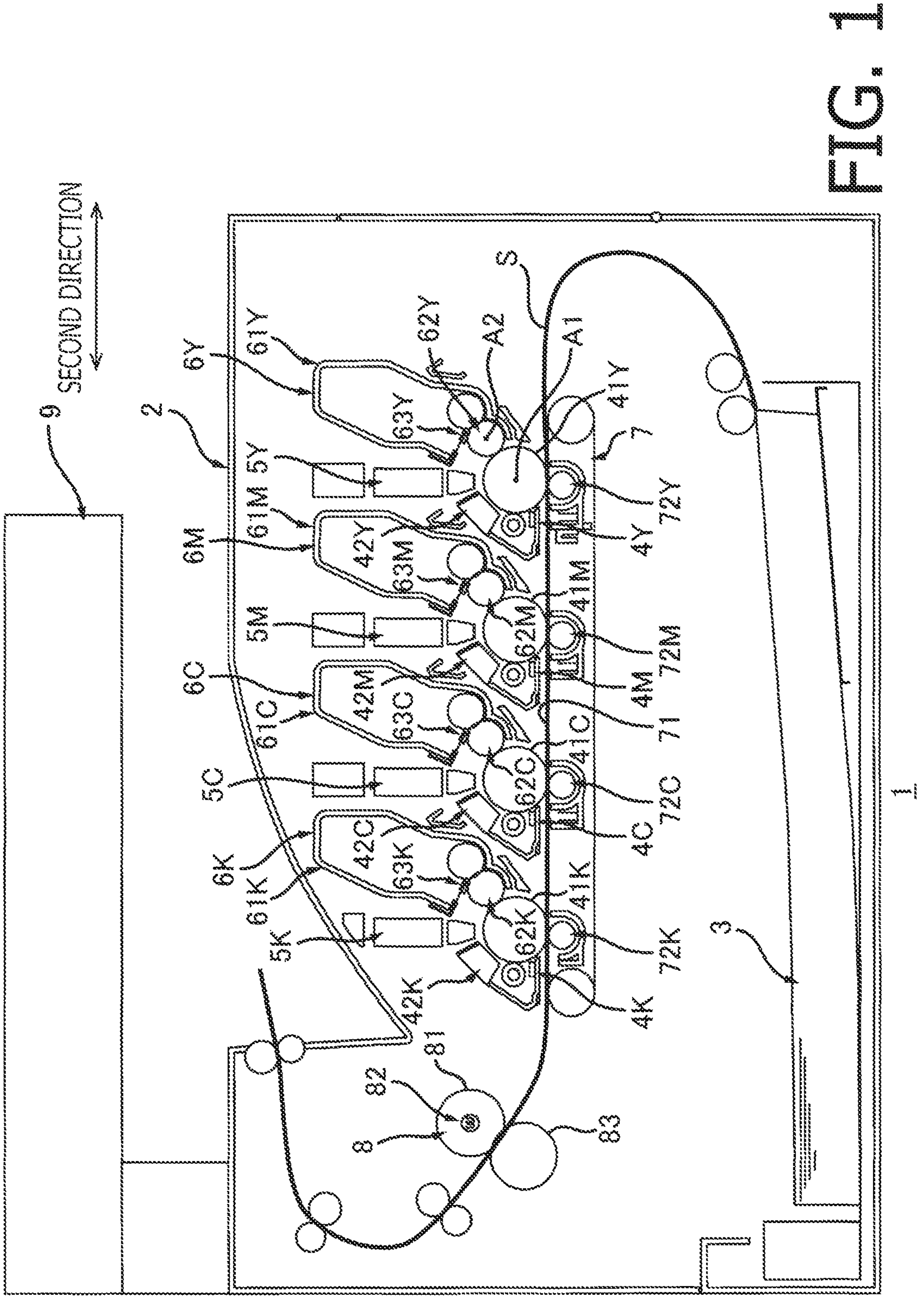
FIG. 1 is an overall cross-sectional view of an image forming apparatus.

With reference to FIG. 1, an overall configuration of the image forming apparatus 1 according to a first embodiment of the present disclosure will be described.

The image forming apparatus 1 has a main body housing 2, a sheet container 3, a plurality of drum units 4Y, 4M, 4C, 4K, a plurality of exposure heads 5Y, 5M, 5C, 5K, a plurality of developing units 6Y, 6M, 6C, 6K, a transfer device 7, a fuser 8, and a reader 9.

1.1 Main Body Housing 2

The main body housing 2 accommodates the sheet container 3, the drum units 4Y, 4M, 4C, 4K, the exposure heads 5Y, 5M, 5C, 5K, the developing units 6Y, 6M, 6C, 6K, the transfer device 7, and the fuser 8.

1.2 Sheet Container 3

The sheet container 3 may contain sheets S. The sheets S may be, for example printing paper. The sheets S may be conveyed one by one from the sheet container 3 toward a photosensitive drum 41Y in the drum unit 4Y.

1.3 Drum Units 4Y, 4M, 4C, 4K

The drum unit 4Y includes the photosensitive drum 41Y and a charger 42Y. In other words, the image forming apparatus 1 includes the photosensitive drum 41Y.

The photosensitive drum 41Y has a cylindrical shape. The photosensitive drum 41Y extends in a first direction. The photosensitive drum 41Y is rotatable on an axis A1. The axis A1 extends in the first direction.

The charger 42Y may charge a surface of the photosensitive drum 41Y. The charger 42Y is a scorotron-typed charger. Optionally, the charger 42Y may be a charging roller.

The drum units 4Y, 4M, 4C, 4K align in a second direction, which intersects with the first direction. Preferably, the second direction intersects orthogonally with the first direction. The drum units 4Y, 4M, 4C, 4K align in an order: the drum unit 4Y, the drum unit 4M, the drum unit 4C, and the drum unit 4K, in which the drum unit 4Y is farthest from the fuser 8 and the drum unit 4K is closest to the fuser 8. The drum units 4M, 4C, 4K may be described similarly to the drum unit 4Y; therefore, description of the drum units 4M, 4C, 4K is herein omitted.

1.4 Exposure Heads 5Y, 5M, 5C, 5K

The exposure head 5Y may expose the surface of the photosensitive drum 41Y charged by the charger 42Y. The exposure head 5M may expose a surface of the photosensitive drum 41M charged by the charger 42M. The exposure head 5C may expose a surface of the photosensitive drum 41C charged by the charger 42C. The exposure head 5K may expose a surface of the photosensitive drum 41K charged by the charger 42K.

1.5 Developing Units 6Y, 6M, 6C, 6K

The developing unit 6Y may supply toner to the photosensitive drum 41Y. In particular, the developing unit 6Y may supply toner to the surface of the photosensitive drum 41Y, which has been exposed to light from the exposure head 5Y. The developing unit 6Y includes a developer housing 61Y, a developing roller 62Y, and a thickness-regulating blade 63Y.

The developer housing 61Y may store the toner.

The developing roller 62Y may supply the toner in the developer housing 61Y to the surface of the photosensitive drum 41Y. The developing roller 62Y is in contact with the photosensitive drum 41Y. Alternatively, the developing roller 62Y may be separated from the photosensitive drum 41Y by a predetermined amount of gap. The developing roller 62Y has a cylindrical shape. The developing roller 62Y extends in the first direction. The developing roller 62Y may rotate on an axis A2, which extends in the first direction.

The thickness-regulating blade 63Y may regulate a thickness of the toner applied on the developing roller 62Y.

The developing units 6M, 6C, 6K may be described similarly to the developing unit 6Y; therefore, description of the developing units 6M, 6C, 6K is herein omitted.

1.6 Transfer Device 7

The transfer device 7 includes a belt 71 and a plurality of transfer rollers 72Y, 72M, 72C 72K.

The belt 71 may convey the sheet S from the sheet container 3 toward the fuser 8. The belt 71 is in contact with the photosensitive drums 41Y, 41M, 41C, 41K.

The transfer roller 72Y may transfer the toner on the photosensitive drum 71Y to the sheet S being conveyed by the belt 71. The transfer roller 72M may transfer the toner on the photosensitive drum 71M to the sheet S being conveyed by the belt 71. The transfer roller 72C may transfer the toner on the photosensitive drum 71C to the sheet S being conveyed by the belt 71. The transfer roller 72K may transfer the toner on the photosensitive drum 71K to the sheet S being conveyed by the belt 71.

1.7 Fuser 8

The fuser 8 may heat and press the sheet S, onto which the toners are transferred. The fuser 8 may thermally fix the toners transferred from the photosensitive drums 41Y, 41M, 41C, 41K on the sheet S. In particular, the fuser 8 has a heat roller 81, a heater 82, and a pressure roller 83. When the sheet S is conveyed through a position between the heat roller 81 and the pressure roller 83, the heat roller 81 may heat the sheet S. The heater 82 is arranged inside the heat roller 81 and may heat the heat roller 81. When the sheet S passes through the position between the heat roller 81 and the pressure roller 83, the pressure roller 83 may press the sheet S against the heat roller 81. The sheet S exiting the fuser 8 may be ejected at an area between the main body housing 2 and the reader 9.

1.8 Reader 9

The reader 9 may read an image of an original material. The reader 9 is located above the main body housing 2. With the reader 9 being located above the main body housing 2, the image forming apparatus 1 may be in a structure, in which humidity tends to stay inside main body housing 2. Optionally, the image forming apparatus 1 may not have the reader 9.

2. Detailed Configuration of Image Forming Apparatus 1

Figure 3:
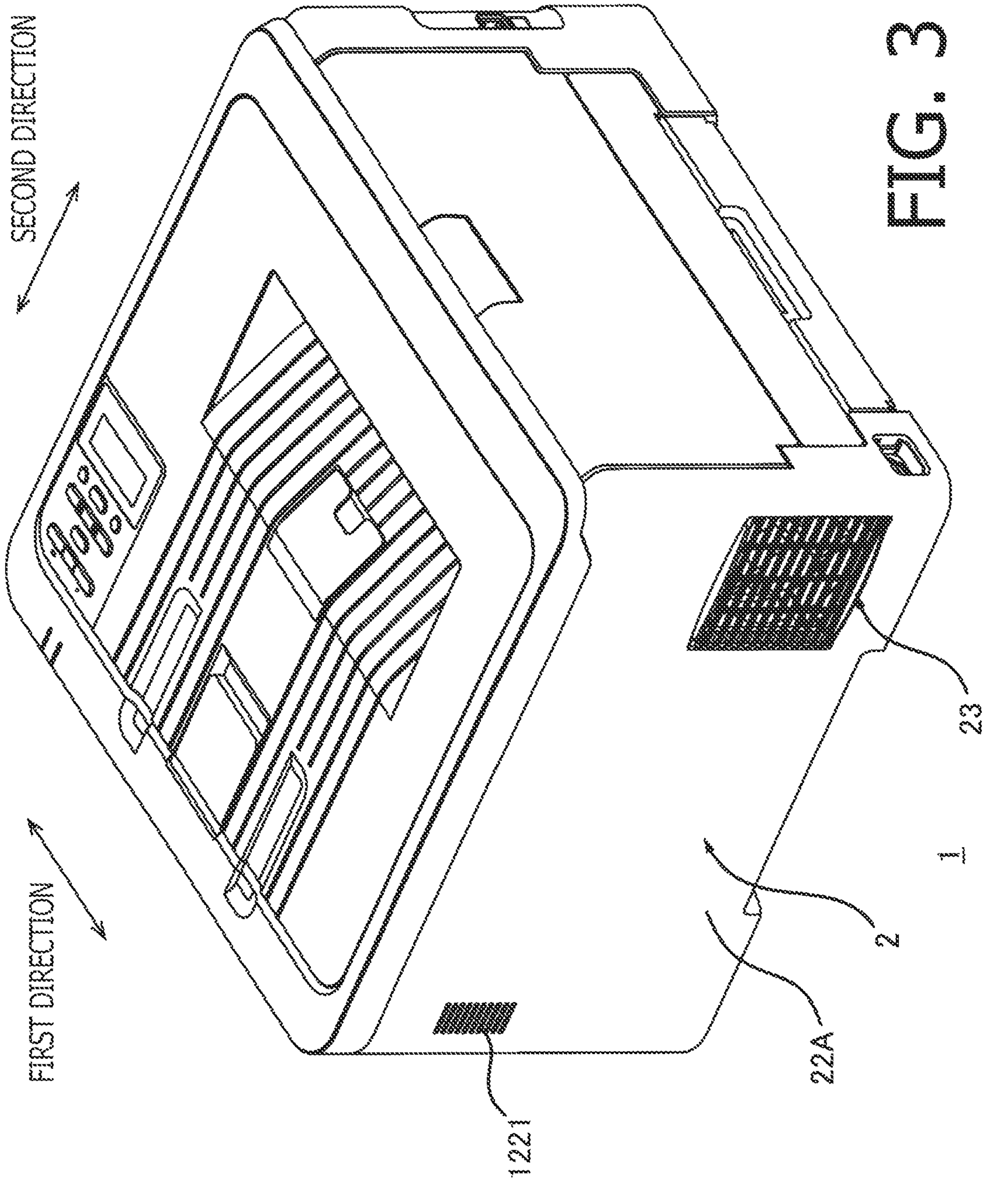
FIG. 3 is a perspective view of a main body housing of the image forming apparatus.
Figure 4:
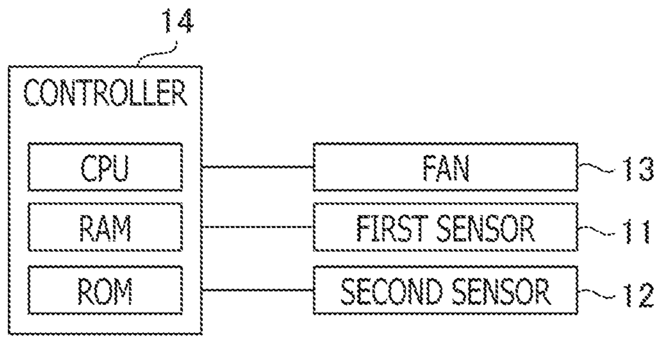
FIG. 4 is a block diagram to illustrate a controlling configuration in the image forming apparatus.

Next, with reference to FIGS. 2-4, the image forming apparatus 1 will be described in detail.

Figure 2:
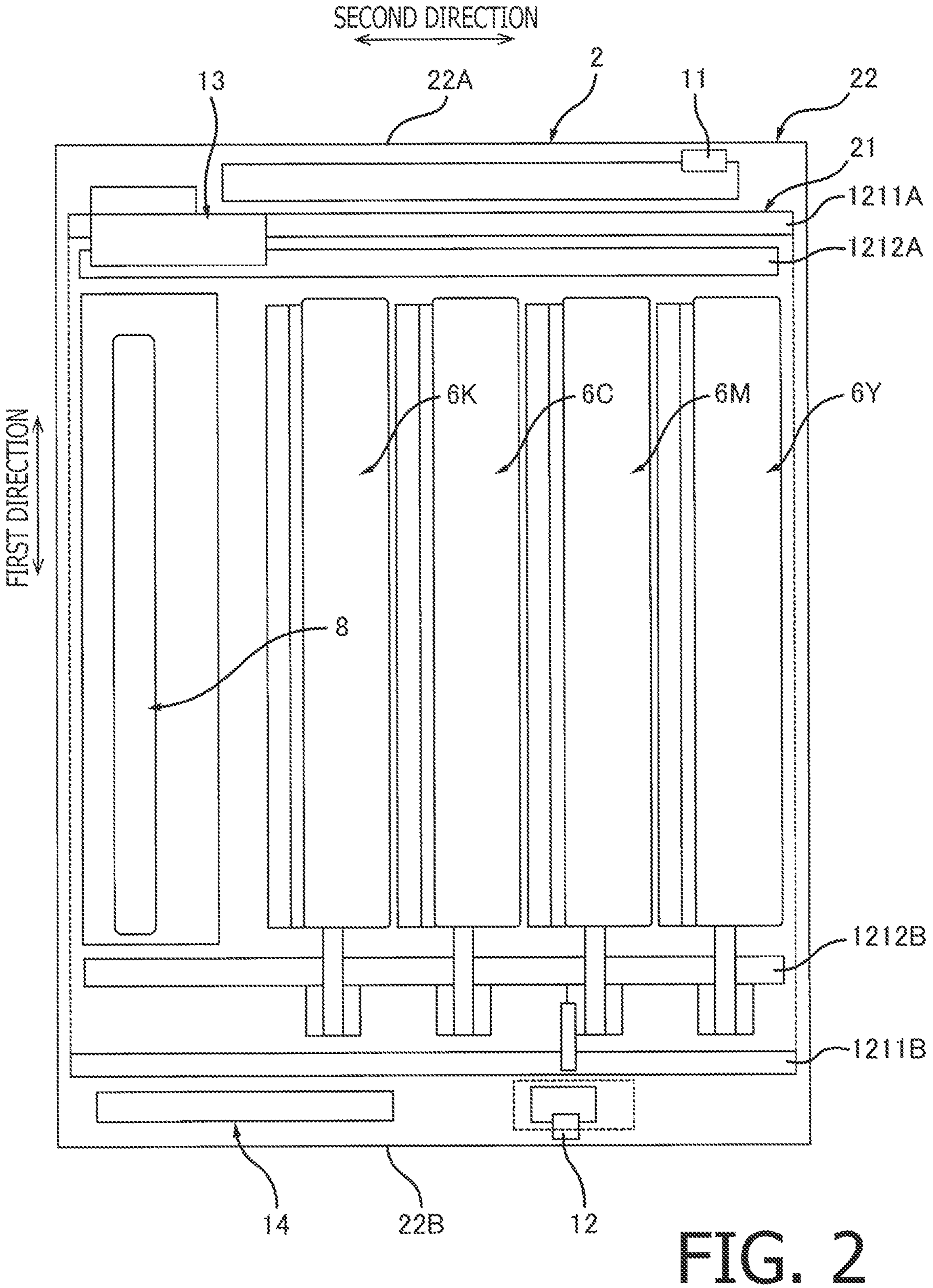
FIG. 2 is a plan view to illustrate arrangement of a first sensor, a second sensor, a fan, and a controller in the image forming apparatus.

As shown in FIG. 2, the image forming apparatus 1 further includes a first sensor 11, a second sensor 12, a fan 13, and a controller 14.

2.1 Detailed Configuration of Main Body Housing 2

The main body housing 2 includes a main body frame 21 and a main body cover 22.

2.1.1 Main Body Frame 21

The main body frame 21 supports the drum units 4Y, 4M, 4C, 4K, the transfer device 7, and the fuser 8. The main body frame 21 includes two (2) side plates 1211A, 1211B and two (2) frames 1212A, 1212B.

The side plate 1211A is located at an end area on one side of the main body housing 2 in the first direction. The side plate 1211A extends in the second direction and a vertical direction. The side plate 1211A is a metal plate made of, for example, iron or stainless steel.

The side plate 1211B is located at an end area on the other side of the main body housing 2 in the first direction. The side plate 1211B is located apart from the side plate 1211A in the first direction. The side plate 1211B extends in the second direction and the vertical direction. The side plate 1211B is a metal plate made of, for example, iron or stainless steel.

The frame 1212A is located between the side plate 1211A and the side plate 1211B in the first direction. The frame 1212A extends in the second direction and the vertical direction. The frame 1212A may be, for example, formed in resin. The frame 1212A is attached to the side plate 1211A.

The frame 1212B is located between the side plate 1211A and the side plate 1211B in the first direction. The frame 1212B is located apart from the frame 1212A in the first direction. The frame 1212B extends in the second direction and the vertical direction. The frame 1212B may be, for example, formed in resin. The frame 1212B is attached to the side plate 1211B.

The drum units 4Y, 4M, 4C, 4K, the transfer device 7, and the fuser 8 are located between the frame 1212A and the frame 1212B in the first direction. The drum units 4Y, 4M, 4C, 4K, the transfer device 7, and the fuser 8 are supported by the frame 1212A and the frame 1212B.

2.1.2 Main Body Cover 22

The main body cover 22 forms an exterior shell of the image forming apparatus 1. The main body cover 22 covers the main body frame 21. The main body cover 22 includes an outer wall 22A and an outer wall 22B, which are located on one side and the other side, respectively, in the first direction.

The outer wall 22A is located at an end of the main body cover 22 on the one side in the first direction. The outer wall 22A is located on a side of the side plate 1211A opposite to the side plate 1211B in the first direction. The outer wall 22A covers the side plate 1211A. The outer wall 22A extends in the vertical direction and the second direction. As shown in FIG. 3, the outer wall 22A has an air outlet opening 23. In other words, the main body housing 2 has the air outlet opening 23 on the outer wall 22A, which is on the one side thereof in the first direction. Therefore, the main body housing 2 may discharge the air through the air outlet opening 23 with the fan 13. Moreover, the outer wall 22A includes a ventilation opening 1221. The ventilation opening 1221 allows the air around the first sensor 11, which will be described further below, to be exchanged with the air outside the main body housing 2.

As shown in FIG. 2, the outer wall 22B is located at an end of the main body housing 2 on the other side in the first direction. The outer wall 22B is located apart from the outer wall 22A in the first direction. The outer wall 22B is located on a side of the side plate 1211B opposite to the side plate 1211A in the first direction. The outer wall 22B covers the side plate 1211B. The outer wall 22B extends in the vertical direction and the second direction.

2.2 First Sensor 11

The first sensor 11 is located in proximity to the outer wall 22A on the one side of the main body housing 2 in the first direction. In particular, the first sensor 11 is located between the outer wall 22A and the side plate 1211A in the first direction. The first sensor 11 is located in proximity to the ventilation opening 1221 in the second direction. Moreover, the first sensor 11 is located on one side of the drum unit 4Y (see FIG. 1), which is farthest from the fuser 8 among the plurality of drum units 4Y, 4M, 4C, 4K. The first sensor 11 is located apart from the fuser 8 in the second direction. The first sensor 11 is located apart farther than the second sensor 12 from the fuser 8 in the second direction. In other words, a distance between the first sensor 11 and the fuser 8 in the second direction is longer than a distance between the second sensor 12 and the fuser 8 in the second direction. The first sensor 11 may measure temperature and relative humidity. The first sensor 11 is a thermistor.

2.3 Second Sensor 12

The second sensor 12 is located on the other side of the main body housing 2 in the first direction. In particular, the second sensor 12 is located in proximity to the outer wall 22B, which is on the other side of the main body housing 2 in the first direction. The second sensor 12 is located apart from the fan 13 so that the second sensor 12 may not be affected straight by airflows caused by the fan 13. The second sensor 12 is located between the outer wall 22B and the side plate 1211B in the first direction. The second sensor 12 is located on a side of the drum unit 4M toward the other side in the first direction. The second sensor 12 is located apart from the fuser 8 in the second direction. The second sensor 12 may measure temperature in an area closer to the photosensitive drum 41M (see FIG. 1) than the fuser 8. The second sensor 12 is a thermistor.

2.4 Fan 13

The fan 13 may generate an airflow in the main body housing 2 toward the air outlet opening 23. The fan 13 is located in proximity to the outer wall 22A, which is located on the one side of the main body housing 2 in the first direction. The fan 13 is located between the outer wall 22A and the fuser 8 in the first direction. The fan 13 is located to face the air outlet opening 23 (see FIG. 3).

2.5 Controller 14

The controller 14 is located between the outer wall 22B and the side plate 1211B in the first direction. The controller 14 is, as shown in FIG. 4, electrically connected with the first sensor 11, the second sensor 12, and the fan 13. The controller 14 includes a controller circuit board. The controller 14 includes a processor and a memory. The processor may be, for example, a CPU. The memory may be a volatile memory or may be a non-volatile memory. The memory may include, for example, a RAM and a ROM.

The controller 14 processes a temperature measured by the first sensor 11 as a first atmosphere temperature T1. The first atmosphere temperature T1 refers to a simulated temperature outside the main body housing 2 when the image forming apparatus 1 is in a standby state. As mentioned above, the first sensor 11, located inside the main body housing 2, is separated from the fuser 8 and is located in the proximity to the ventilation opening 1221 in the outer wall 22A. Therefore, when the image forming apparatus 1 is in the standby state, the temperature measured by the first sensor 11 may be regarded as a temperature outside the main body housing 2.

The controller 14 may estimate a second atmosphere temperature T2 based on a temperature measured by the second sensor 12. The second atmosphere temperature T2 is a temperature of the air around the photosensitive drums 41Y, 41M, 41C, 41K. In particular, the second atmosphere temperature T2 is a temperature around the developing rollers 62Y, 62M, 62C, 62K. More specifically, the second atmosphere temperature T2 is a temperature of the thickness-regulating blades 63Y, 63M, 63C, 63K.

The controller 14 may calculate the second atmosphere temperature T2 in a formula below.

Formula (1) for the second atmosphere temperature T2:

$$\text{Second atmosphere temperature } T2 = a*\log(\text{temperature measured by the second sensor } 12)^2 + b*\log(\text{temperature measured by the second sensor } 12) + c$$

In the formula (1), signs a, b, and c are coefficients obtained by multiple regression analysis of experimental values.

3. Control in Image Forming Apparatus 1

Next, with reference to FIGS. 5-8, controlling flows in the image forming apparatus 1 will be described.

3.1 Setting Beginning-Stage Rotation Speed of Fan

Figure 5:
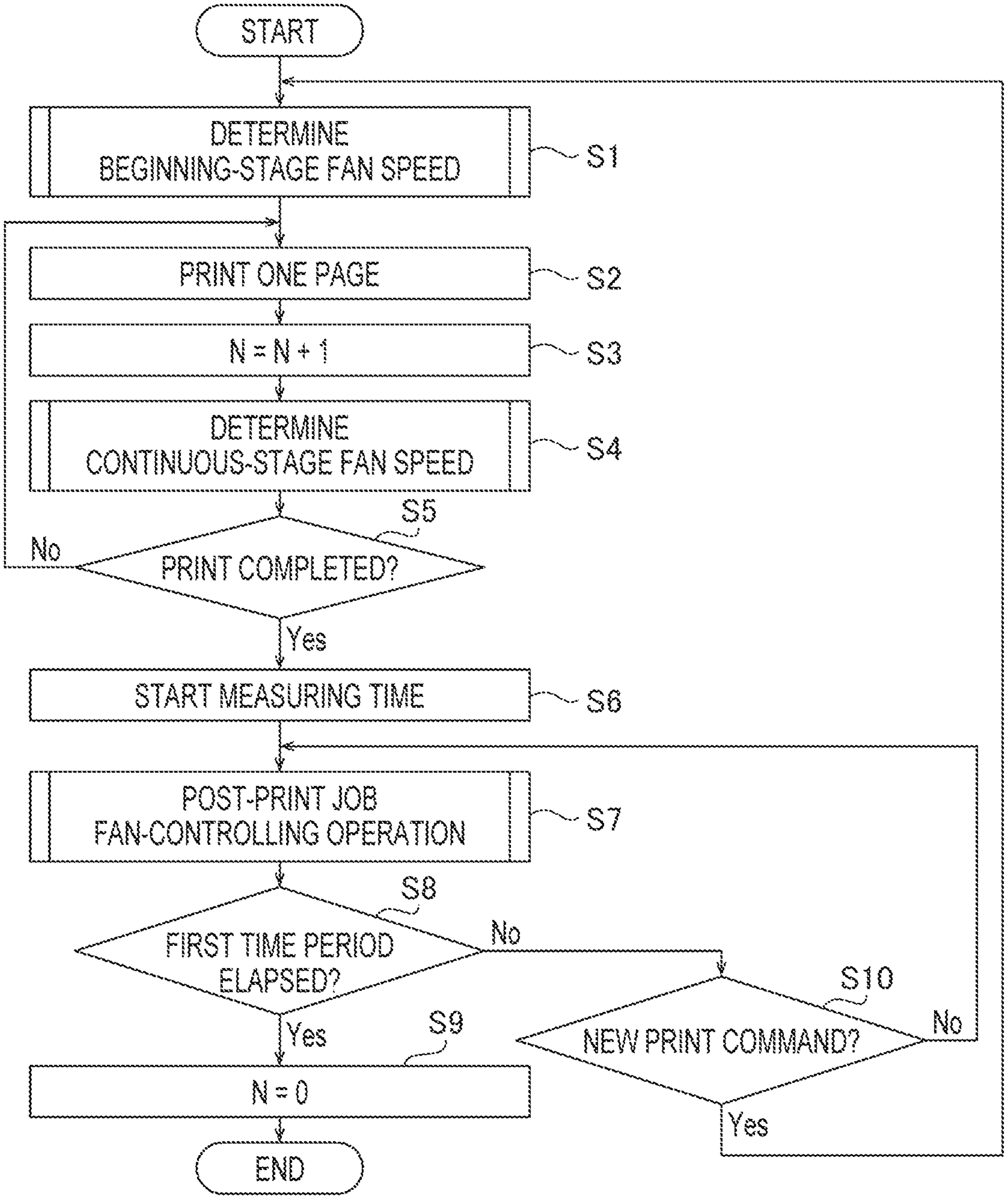
FIG. 5 is a flowchart to illustrate a controlling flow to be performed in the image forming apparatus.

As shown in FIG. 5, in S1, the controller 14 receiving a print command including a print job sets a rotation speed of the fan 13 for a beginning stage of printing. The beginning stage of printing is an earlier part of processes in the print job and may start after receiving the print job and continue until, for example, at least a first page of the image is printed on the sheet S in S2.

Figure 6:
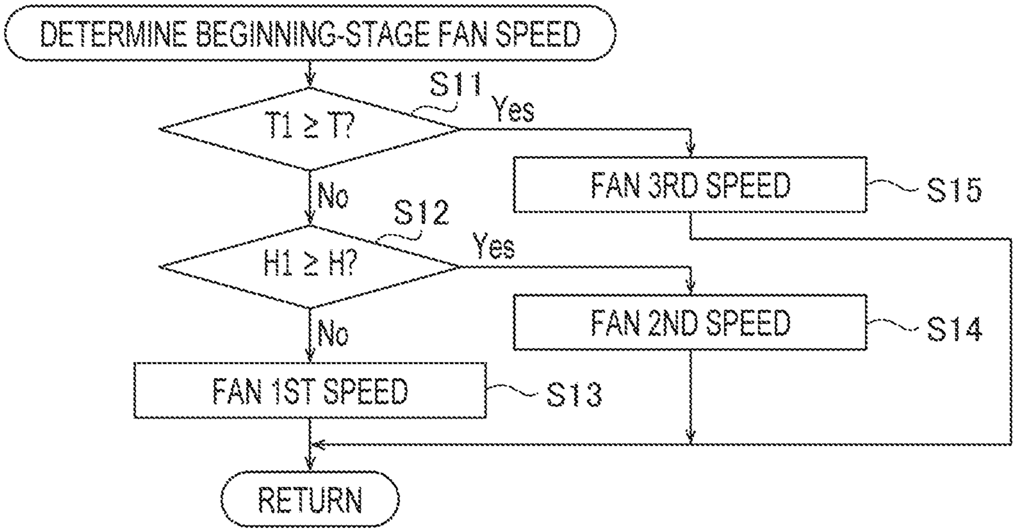
FIG. 6 is a flowchart to illustrate a flow of setting a beginning-stage rotation speed of the fan.

As shown in FIG. 6, the controller 14 sets a beginning-stage rotation speed of the fan 13 based on at least one of the first atmosphere temperature T1 and relative humidity H1 measured by the first sensor 11.

In particular, in the beginning stage of printing, in S11, if the first atmosphere temperature T1 is lower than a predetermined temperature T (S11: NO), and, in S12, if the relative humidity H1 measured by the first sensor 11 is lower than a predetermined degree of humidity H (S12: NO), in S13, the controller 14 sets the rotation speed of the fan 13 at a first speed.

The predetermined temperature T may be, for example, 32 degrees C. The predetermined degree of humidity may be, for example, 60%.

On the other hand, in the beginning stage of printing, in S11, if the first atmosphere temperature T1 is lower than the predetermined temperature (S11: NO), and in S12, if the relative humidity H1 measured by the first sensor 11 is equal to or higher than the predetermined degree of humidity H (S12: YES), in S14, the controller 14 sets the rotation speed of the fan 13 at a second speed. The second speed is higher than the first speed. In other words, if the first atmosphere temperature T1 is lower than the predetermined temperature (S11: NO) and the relative humidity H1 measured by the first sensor 11 is equal to or higher than the predetermined degree of humidity H (S12: YES), the controller 14 may the rotation speed of the fan 13 at the second speed, which is higher than the first speed.

When the relative humidity H1 measured by the first sensor 11 is equal to or higher than the predetermined degree of humidity H, it may be likely that humidity around the image forming apparatus 1, i.e., ambient humidity, is high and that the humidity inside the main body housing 2 is already high before starting of the printing.

Therefore, the controller 14 sets the rotation speed of the fan 13 in the beginning stage of printing to be higher than the first speed.

Accordingly, with the fan 13 being rotated at the speed higher than the first speed from the beginning stage of printing, moisture condensation on the photosensitive drums 41Y, 41M, 41C, 41K may be restrained when the humidity in the ambience is high.

Meanwhile, in the beginning stage of printing, if the first atmosphere temperature T1 is equal to or higher than the predetermined temperature T (S11: YES), in S15, the controller 14 sets the rotation speed of the fan 13 at a third speed. The third speed is higher than the second speed.

3.2 Counting Cumulative Number of Printed Pages

Next, as shown in FIG. 5, the controller 14 conducts the printing based on the print command. During the printing, the controller 14 controls the fan 13 to rotate at the rotation speed having been set previously.

In a continuous stage of printing, which is continued from the beginning stage, in S2-S3, each time a page of image is printed, the controller 14 counts a cumulative printed page number N. The continuous stage may start after printing at least the first page of the image on the sheet S in S2. The cumulative printed page number N is a cumulative number of pages printed by the image forming apparatus 1.

3.3 Setting Continuous-Stage Rotation Speed of the Fan 13

Next, in the continuous stage of printing, in S4, the controller 14 sets the rotation speed of the fan 13 each time a page of image is printed.

Figure 7:
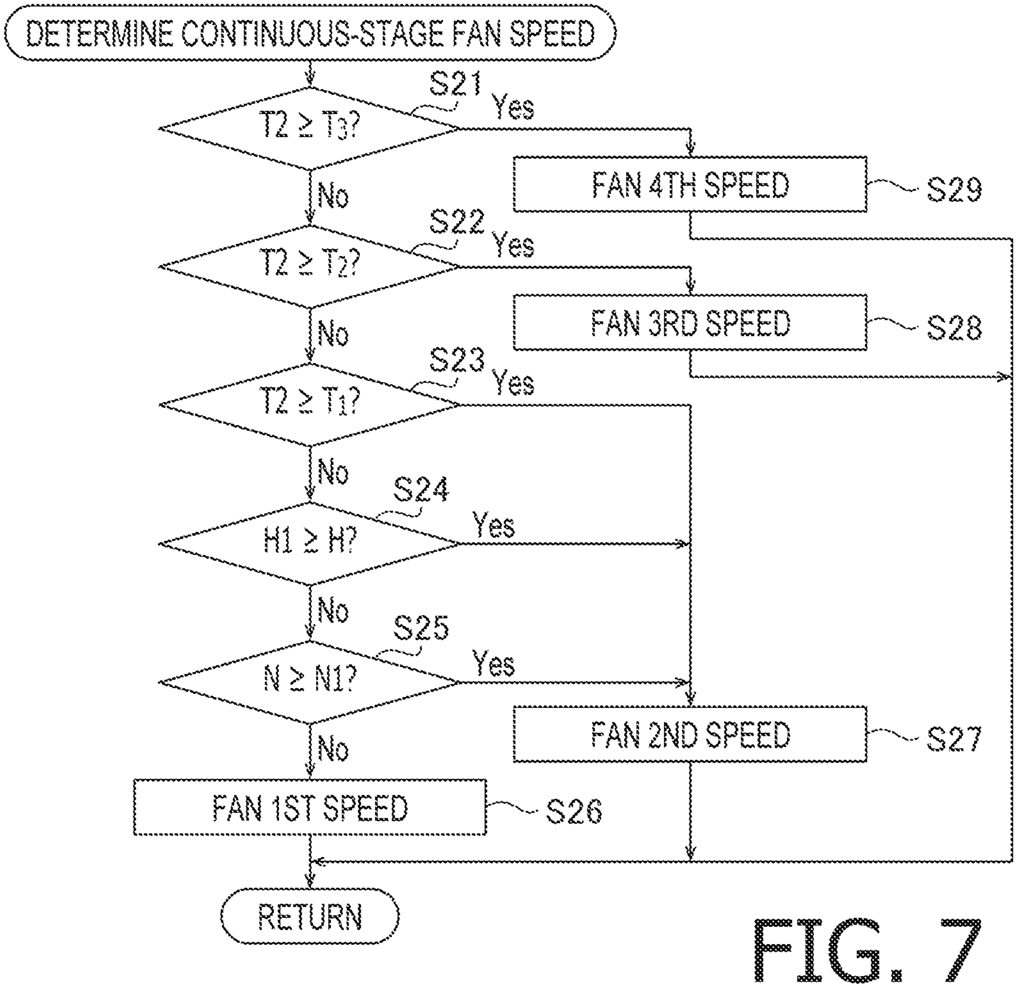
FIG. 7 is a flowchart to illustrate a flow of setting a continuous-stage rotation speed of the fan.

As shown in FIG. 7, in the continuous stage of printing, the controller 14 sets the rotation speed of the fan 13 based on at least one of the second atmosphere temperature T2, the relative humidity H1 measured by the first sensor 11, and the cumulative printed page number N.

While the image forming apparatus 1 is in the standby state, the relative humidity H1 may indicate the ambient humidity. Meanwhile, as the image forming apparatus 1 continues printing, the relative humidity in the main body housing 2 may increase due to the water vapor generated by the printing process. Therefore, while the image forming apparatus 1 is printing, the relative humidity H1 may be regarded as the relative humidity inside the main body housing 2. The first sensor 11 is located on the same side of the main body housing 2 as the fan 13 in the first direction. Therefore, the first sensor 11 tends to be affected by the airflow generated by the fan 13, and compared to an arrangement, in which the first sensor 11 is located on the side opposite to the fan 13 in the first direction, the first sensor 11 may detect the change of the humidity in the main body housing 2 earlier.

In particular, in the continuous stage of printing, in S21-S23, if the second atmosphere temperature T2 is lower than a third temperature $T_3$, a second temperature $T_2$, and a first temperature $T_1$ (S21: NO, S22: NO, S23: NO), in S24, if the relative humidity H1 measured by the first sensor 11 is lower than the predetermined degree of humidity H (S24: NO), and in S25, if the cumulative printed page number N is smaller than a first page number N1 (S25: NO), in S26, the controller 14 sets the rotation speed of the fan 13 at the first speed. In other words, in the continuous stage of printing, if the second atmosphere temperature T2 is lower than the first temperature $T_1$ (S21: NO, S22: NO, S23: NO), if the relative humidity H1 measured by the first sensor 11 is lower than the predetermined degree of humidity H (S24: NO), and if the cumulative printed page number N is smaller than the first page number N1 (S25: NO), the controller 14 conducting the printing process controls the fan 13 to rotate at the first speed.

The first temperature $T_1$ may be, for example, 31 degrees C. The second temperature $T_2$ is higher than the first temperature $T_1$. The second temperature $T_2$ may be, for example, 36 degrees C. The third temperature $T_3$ is higher than the second temperature $T_2$. The third temperature $T_3$ may be, for example, 39 degrees C. The first page number N1 may be, for example, 60%.

Until the cumulative printed page number N reaches the first page number N1, the relative humidity inside the main body housing 2 due to the water vapor generated by the printing process may increase moderately; therefore, while the printing process continues, the rotation speed of the fan 13 is maintained at the first speed.

Accordingly, the air around the fuser 8 may be substantially restrained from being carried to the photosensitive drums 41Y, 41M, 41C, 41K by the airflow due to the rotation of the fan 13 while the relative humidity inside the main body housing 2 may be least restrained from increasing.

Moreover, while the rotation speed of the fan 13 is suppressed to the first speed, noise from the fan 13 may be suppressed.

On the other hand, in the continuous stage of printing, in S21-S23, if the second atmosphere temperature T2 is lower than the first temperature $T_1$ (S21: NO, S22: NO, S23: NO), in S24, if the relative humidity H1 measured by the first sensor 11 is lower than the predetermined degree of humidity H (S24: NO), and in S25, if the cumulative printed page number N is equal to or larger than the first page number N1 (S25: YES), in S27, the controller 14 sets the rotation speed of the fan 13 at the second speed. In other words, in the continuous stage of printing, if the second atmosphere temperature T2 is lower than the first temperature $T_1$ (S21: NO, S22: NO, S23: NO), if the relative humidity H1 measured by the first sensor 11 is lower than the predetermined degree of humidity H (S24: NO), and if the cumulative printed page number N is equal to or larger than the first page number N1 (S25: YES), the controller 14 controls the fan 13 to rotate at the second speed.

Meanwhile, when the cumulative printed page number N reaches the first page number N1 while the print job including a plurality of pages is being processed, the controller 14 shifts the rotation speed of the fan 13 from the first speed to the second speed in midst of the print job.

Once the cumulative printed page number N reaches the first page number N1, it may be likely that the relative humidity in the main body housing 2 is increased by the ongoing printing process; therefore, the fan 13 is operated to rotate at the second speed which is faster than the first speed.

Thus, the relative humidity in the main body housing 2 may be restrained from increasing excessively, and moisture condensation on the surface of the photosensitive drum 41Y may be restrained.

Meanwhile, in the continuous stage of printing, in S21-S23, if the second atmosphere temperature T2 is lower than the first temperature $T_1$ (S21: NO, S22: NO, S23: NO), and in S24, if the relative humidity H1 measured by the first sensor 11 is equal to or higher than the predetermined degree of humidity H (S24: YES), in S27, the controller 14 sets the rotation speed of the fan 13 at the second speed.

Moreover, in the continuous stage of printing, in S21-S23, if the second atmosphere temperature T2 is lower than the second temperature $T_2$ but is equal to or higher than the first temperature $T_1$ (S21: NO, S22: NO, S23: YES), in S27, the controller 14 sets the rotation speed of the fan 13 at the second speed. In other words, in the continuous stage of printing, if the second atmosphere temperature T2 is lower than the second temperature $T_2$ but is equal to or higher than the first temperature $T_1$ (S21: NO, S22: NO, S23: YES), the controller 14 controls the fan 13 to rotate at the second speed.

Meanwhile, in the continuous stage of printing, in S21-S22, if the second atmosphere temperature T2 is lower than the third temperature $T_3$ but is equal to or higher than the second temperature $T_2$ (S21: NO, S22: YES), in S28, the controller 14 sets the rotation speed of the fan 13 at the third speed. In other words, in the continuous stage of printing, if the second atmosphere temperature T2 is lower than the third temperature $T_3$ but is equal to or higher than the second temperature $T_2$ (S21: NO, S22: YES), the controller 14 controls the fan 13 to rotate at the third speed.

Meanwhile, in the continuous stage of printing, in S21, if the second atmosphere temperature T2 is equal to or higher than the third temperature $T_3$ (S21: YES), in S29, the controller 14 sets the rotation speed of the fan 13 at a fourth speed. In other words, in the continuous stage of printing, if the second atmosphere temperature T2 is equal to or higher than the third temperature $T_3$ (S21: YES), the controller 14 controls the fan 13 to rotate at the fourth speed, which is faster than the third speed.

Thus, according to rising of the second atmosphere temperature T2, the rotation speed of the fan 13 may be increased stepwise. Therefore, the noise from the fan 13 may be suppressed, and, depending on the necessity, inside of the main body housing 2 may be cooled.

As shown in FIG. 5, the controller 14 repeats S3 to count the cumulative printed page number N and S4 to set the rotation speed of the fan 13 for each page to print (S2) until the print job is completed (S5: NO).

3.4 Post-Print Job Fan-Controlling Operation

Next, in S5, when the print job is completed (S5: YES), in S6, the controller 14 starts measuring time and starts a post-print job fan-controlling operation in S7.

Figure 8:
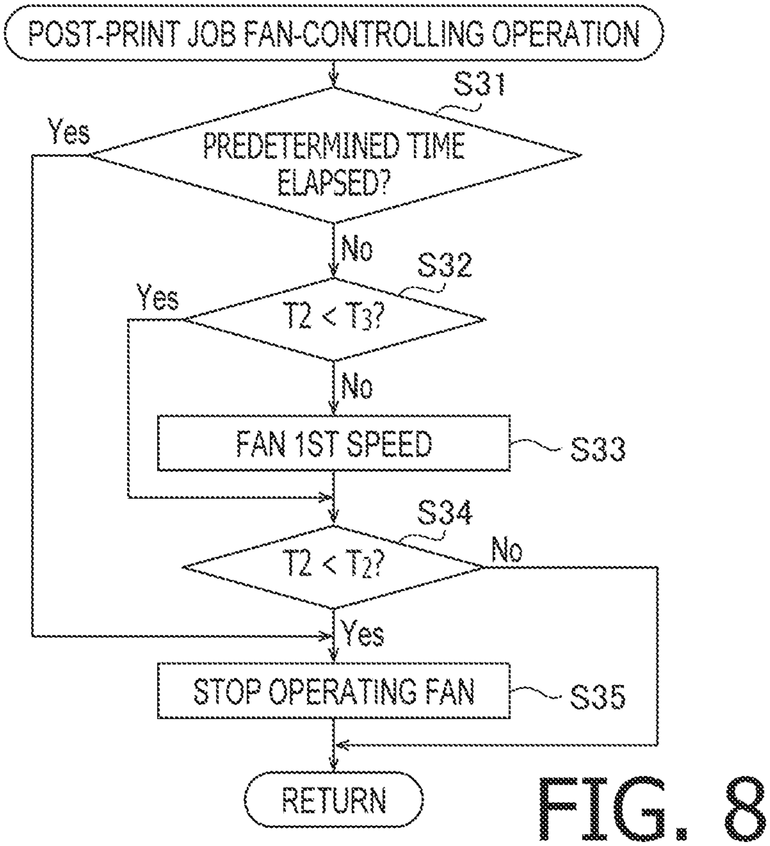
FIG. 8 is a flowchart to illustrate a flow of a post-print job fan-controlling operation.

As shown in FIG. 8, in the post-print job fan-control operation, within a predetermined time period since the completion of the print job (S31: NO), in S32, if the second atmosphere temperature T2 is equal to or higher than the third temperature $T_3$ (S32: NO), in S33, the controller 14 controls the fan 13 to rotate at the first speed.

The predetermined time period may be, for example, 20 minutes.

On the other hand, within the predetermined time period since the completion of the print job (S31: NO), in S32-S34, if the second atmosphere temperature T2 is lower than the second temperature $T_2$ (S32: YES, S34: YES), in S35, the controller 14 controls the fan 13 to stop operating.

Meanwhile, within the predetermined time period since the completion of the print job (S31: NO), in S32, if the second atmosphere temperature T2 is lower than the third temperature $T_3$ and, in S34, if the second atmosphere temperature T2 is equal to or higher than the second temperature $T_2$ (S32: YES, S34: NO), the controller 14 maintains the rotation speed of the fan 13 at the first speed.

After the predetermined time period since the completion of the print job (S31: YES), in S35, the controller 14 controls the fan 13 to stop operating.

Next, as shown in FIG. 5, after a first time period since the completion of the print job (S8: YES), in S9, the controller 14 clears the cumulative printed page number N to zero (0). In other words, when the first time period elapsed without conducting a printing process (S8: YES), the controller 14 clears the cumulative printed page number N to zero.

The first time period is a substantial length of time to lower the relative humidity in the main body housing 2 and may be, for example, two (2) hours.

When the first time period since the completion of the print job elapses without conducting a printing process (S8: YES), the cumulative printed page number N is cleared to zero so that the rotation speed of the fan 13 may be suppressed to the first speed under the condition where the relative humidity in the main body housing 2 is lowered.

Meanwhile, before the first time period since the completion of the print job elapses (S8: NO), in S10, if a new print command is received (S10: YES), in S1, the controller 14 sets the rotation speed of the fan 13 to the beginning-stage rotation speed.

On the other hand, before the first time period since the completion of the print job elapses (S8: NO), in S10, if no new print command is received (S10: NO), in S7, the controller 14 continues the post-print job fan-controlling operation in S7.

4. Benefits (1) According to the image forming apparatus 1, as shown in FIG. 7, in the continuous stage of printing, the relative humidity in the main body housing 2 due to the water vapor generated in the printing process may increase moderately; therefore, until the cumulative printed page number N reaches the first page number N1 (S25: YES), the rotation speed of the fan 13 may be suppressed at the first speed (S26).

Therefore, while the air surrounding the fuser 8 may be substantially restrained from being carried to the photosensitive drums 41Y, 41M, 41C, 41K by the airflow caused by the rotation of the fan 13, the relative humidity in the main body housing 2 may be least restrained from increasing.

Moreover, while the rotation speed of the fan 13 is maintained at the first speed, the noise from the running fan 13 may be suppressed.

In the continuous stage of printing, if the cumulative printed page number N reaches to be equal to or greater than the first page number N1 (S25: YES), the controller 14 may control the fan 13 to rotate at the second speed, which is higher than the first speed (S27).

That is, when the cumulative printed page number N reaches the first page number N1, it may be likely that the relative humidity in the main body housing 2 is high due to the printing process. In this regard, the fan 13 may be rotated at the second speed, which is higher than the first speed.

Therefore, while the relative humidity in the main body housing 2 may be restrained from increasing excessively, moisture condensation on the surfaces of the photosensitive drums 41Y, 41M, 41C, 41K may be restrained.

(2) According to the image forming apparatus 1, as shown in FIG. 5, when the first time period elapses without conducting a printing process (S8: YES), the controller 14 clears the cumulative printed page number N to zero (S9).

That is, when the relative humidity in the main body housing 2, which was once increased by the printing process, is lowered after the first time period without conducting a printing process (S8: YES), the cumulative printed page number N may be cleared to zero.

Thus, the rotation speed of the fan 13 may be set again to the first speed under the condition where the relative humidity in the main body housing 2 is lowered.

(3) According to the image forming apparatus 1, as shown in FIG. 7, when the cumulative printed page number N reaches the first page number N1 while the print job including a plurality of pages is being processed, the controller 14 shifts the rotation speed of the fan 13 from the first speed to the second speed during the ongoing print job.

Thus, while a print job is being processed, in the case where the relative humidity in the main body housing 2 is likely to be increased due to the printing process, the fan 13 may be rotated at the second speed, which is higher than the first speed, and the relative humidity in the main body housing 2 may be restrained from increasing excessively.

(4) According to the image forming apparatus 1, as shown in FIG. 7, when the second atmosphere temperature T2 is equal to or higher than the first temperature $T_1$ (S23: YES), the controller 14 may control the fan 13 to rotate at the second speed (S25).

Moreover, while the printing continues, if the second atmosphere temperature T2 is equal to or higher than the second temperature $T_2$ (S22: YES), the controller 14 controls the fan 13 to rotate at the third speed (S28). The second temperature $T_2$ is higher than the first temperature $T_1$. The third speed is higher than the second speed.

Meanwhile, in the continuous stage of printing, if the second atmosphere temperature T2 is equal to or higher than the third temperature $T_3$ (S21: YES), the controller 14 controls the fan 13 to rotate at the fourth speed (S29). The third temperature $T_3$ is higher than the second temperature $T_2$. The fourth speed is higher than the third speed.

Thus, according to rising of the second atmosphere temperature $T_2$, the rotation speed of the fan 13 may be increased stepwise. Therefore, the noise from the fan 13 may be suppressed, and, depending on the necessity, inside of the main body housing 2 may be cooled.

(5) According to the image forming apparatus 1, as shown in FIG. 6, in the beginning stage of printing, if the relative humidity H1 measured by the first sensor 11 is equal to or higher than the predetermined degree of humidity H (S12: YES), the controller 14 controls the fan 13 to rotate at the second speed (S14).

When the relative humidity H1 measured by the first sensor 11 is high, it may be likely that the ambient humidity around the image forming apparatus 1 is high and that the humidity inside the main body housing 2 is already high before the printing is started.

Therefore, the controller 14 sets the rotation speed of the fan 13 at the second speed from the beginning stage of printing.

Accordingly, moisture condensation on the photosensitive drums 41Y, 41M, 41C, 41K may be restrained even when the humidity in the ambience is high.

5. First Modified Example

Next, with reference to FIGS. 9-10, a first modified example of the first embodiment will be described below. In the description of the first modified example, items and processes that are identical to those in the first embodiment described above will be referred to by the same reference signs, and description of those will be herein omitted.

Figure 9:
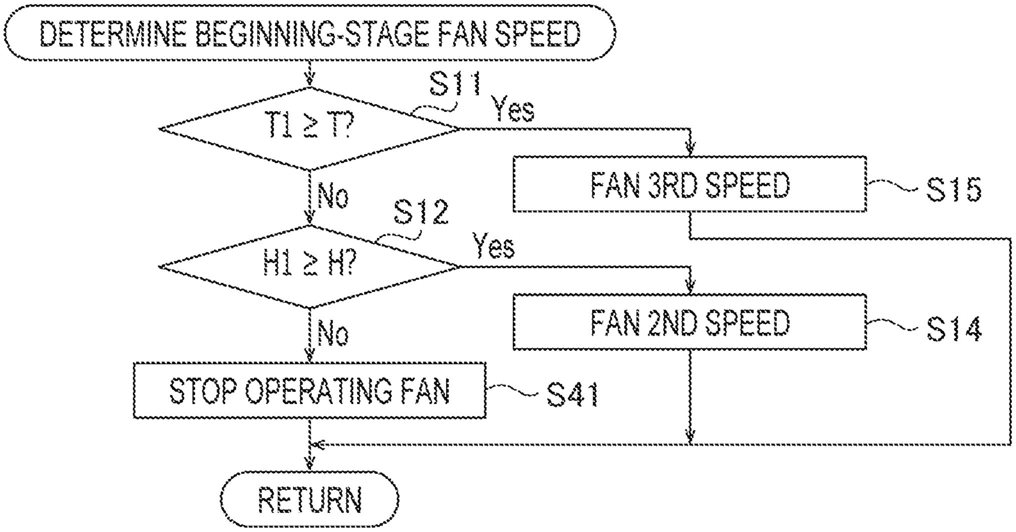
FIG. 9 is a flowchart to illustrate a flow of setting a beginning-stage rotation speed of the fan in a first modified example.

In the first modified example, in S1 (see FIG. 5), when the rotation speed of the fan 13 is set in the beginning stage of printing, as shown in FIG. 9, in S11, if the first atmosphere temperature T1 is lower than the predetermined temperature T (S11: NO), and in S12, if the relative humidity H1 measured by the first sensor 11 is lower than the predetermined degree of humidity H (S12: NO), the controller 14 does not operate the fan 13 in the beginning stage of printing in S41.

In this arrangement, the noise from the fan 13 in the beginning stage of printing may be suppressed.

Figure 10:
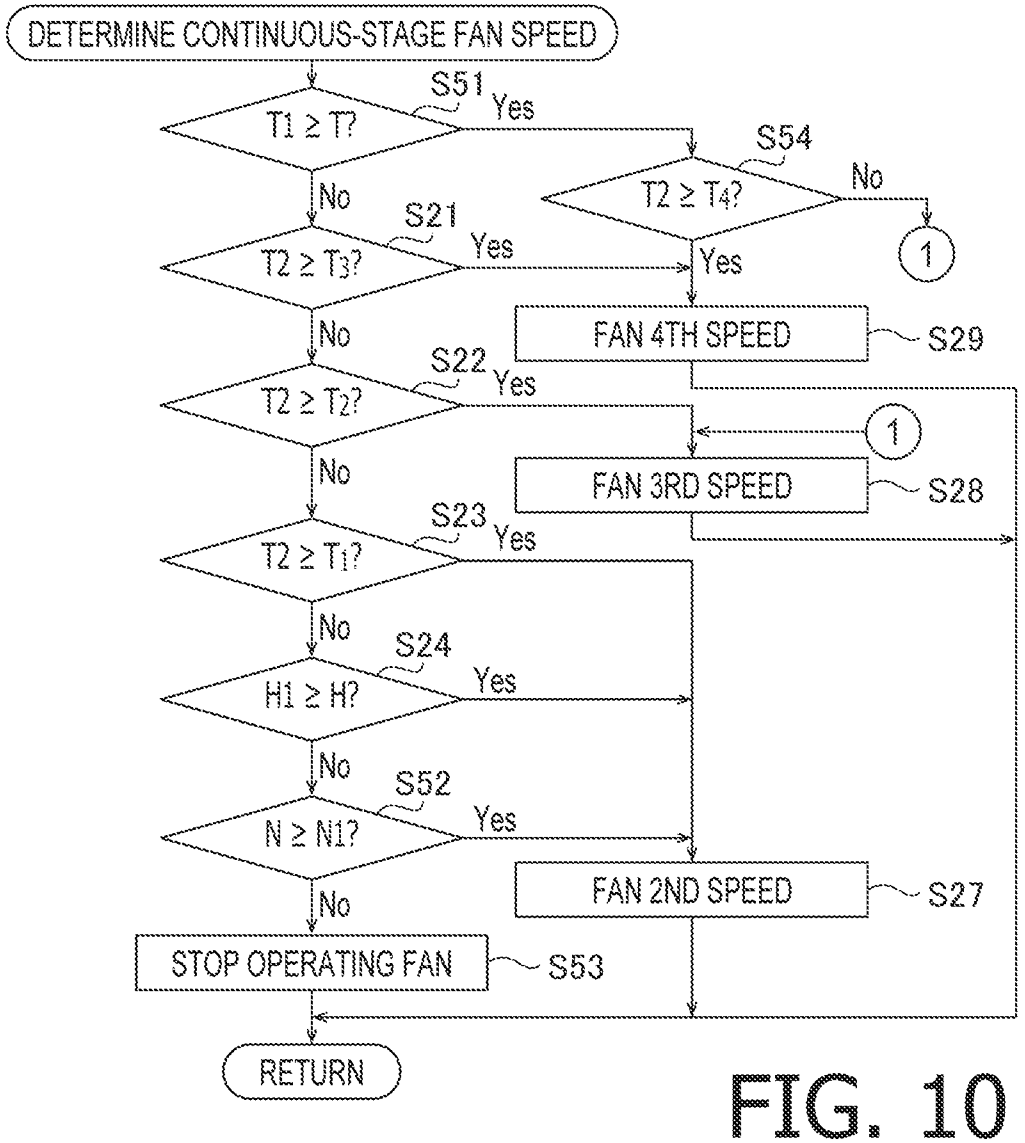
FIG. 10 is a flowchart to illustrate a flow of setting a continuous-stage rotation speed of the fan in the first modified example.

Moreover, as shown in FIG. 10, in the continuous stage of printing, the controller 14 may set the rotation speed of the fan 13 based on at least one of the first atmosphere temperature T1, the second atmosphere temperature T2, the relative humidity H1 measured by the first sensor 11, and the cumulative printed page number N.

In particular, in the continuous stage of printing, in S51, if the first atmosphere temperature T1 is lower than the predetermined temperature T (S51: NO), in S21-S23, if the second atmosphere temperature T2 is lower than the third temperature $T_3$, the second temperature $T_2$, and the first temperature $T_1$ (S21: NO, S22: NO, S23: NO), in S24, if the relative humidity H1 measured by the first sensor 11 is lower than the predetermined degree of humidity H (S24: NO), and in S52, if the cumulative printed page number N is smaller than the first page number N1 (S52: NO), the controller 14 does not operate the fan 13 in S53.

The first page number N1 in the first modified example may be, for example, 120.

Moreover, in the first modified example, in the continuous stage of printing, in S51, if the first atmosphere temperature T1 is equal to or higher than the predetermined temperature T (S51: YES), and in S54, if the second atmosphere temperature T2 is lower than a fourth temperature $T_4$ (S54: NO), the controller 14 sets the rotation speed of the fan 13 at the third speed in S28.

The fourth temperature $T_4$ may be, for example, 41.5 degrees C.

Meanwhile, in S51, if the first atmosphere temperature T1 is equal to or higher than the predetermined temperature T (S51: YES), and in S54, if the second atmosphere temperature T2 is equal to or higher than the fourth temperature $T_4$ (S54: YES), the controller 14 sets the rotation speed of the fan 13 at the fourth speed in S29.

According to the first modified example, the benefits achievable from the first embodiment described above may be substantially achieved.

6. Second Modified Example

Next, with reference to FIG. 11, a second modified example of the first embodiment will be described below. In the description of the first modified example, items and processes that are identical to those in the first embodiment described above will be referred to by the same reference signs, and description of those will be herein omitted.

Figure 11:
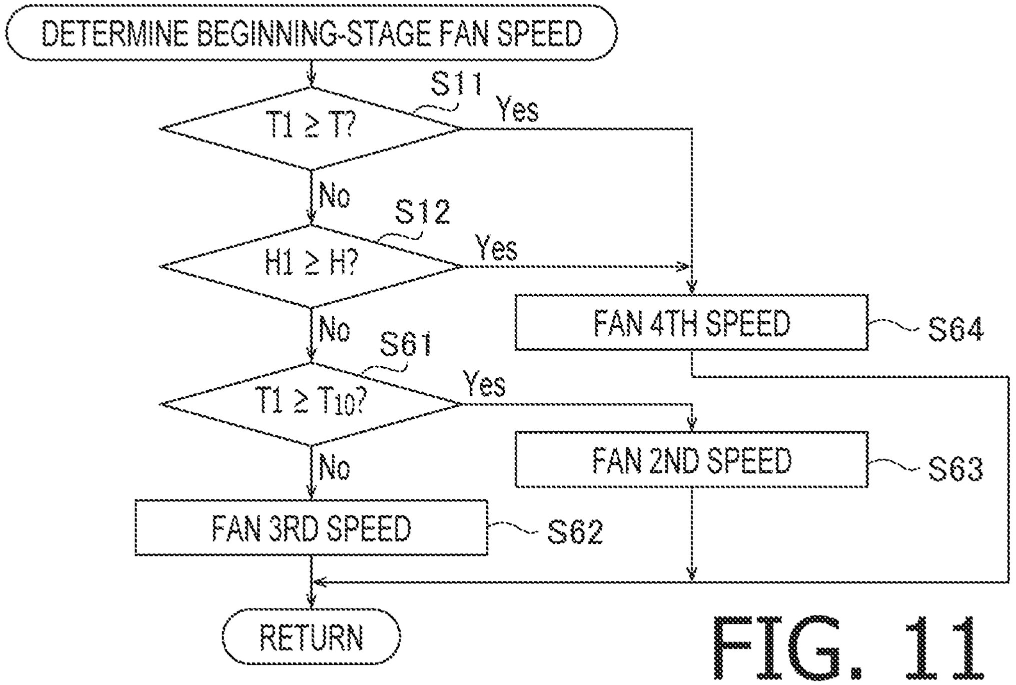
FIG. 11 is a flowchart to illustrate a flow of setting a beginning-stage rotation speed of the fan in a second modified example.

In the second modified example, in S1 (see FIG. 5), when the rotation speed of the fan 13 is set in the beginning stage of printing, as shown in FIG. 11, in S11, if the first atmosphere temperature T1 is lower than the predetermined temperature T (S11: NO), in S12, if the relative humidity H1 measured by the first sensor 11 is lower than the predetermined degree of humidity H (S12: NO), and in S61, if the first atmosphere temperature T1 is lower than a second predetermined temperature $T_{10}$ (S61: NO), in S62, the controller 14 sets the rotation speed of the fan 13 at the third speed, which is higher than the second speed and therefore higher than the first speed.

The predetermined degree of humidity H in the second modified example may be, for example 55%. The second predetermined temperature $T_{10}$ may be, for example, 20 degrees C.

In the beginning stage of printing, even when the relative humidity H1 measured by the first sensor 11 is low (S12: NO), and if the first atmosphere temperature T1 is low (S61: NO), the temperature of the surfaces of the photosensitive drums 41Y, 41M, 41C, 41K may be low. Therefore, it may be likely that moisture may be condensed on the surfaces of the photosensitive drums 41Y, 41M, 41C, 41K.

Therefore, in the beginning stage of printing, the fan 13 may be rotated at the third speed, which is higher than the first speed.

Accordingly, moisture condensation on the photosensitive drums 41Y, 41M, 41C, 41K may be restrained even when the temperature of the ambience around the image forming apparatus 1 is low.

Meanwhile, in the beginning stage of printing, if the first atmosphere temperature T1 is lower than the predetermined temperature T (S11: NO), if the relative humidity H1 measured by the first sensor 11 is lower than the predetermined degree of humidity H (S12: NO), and if the first atmosphere temperature T1 is equal to or higher than the second predetermined temperature $T_{10}$ (S61: YES), the controller 14 sets the rotation speed of the fan 13 at the second speed (S63).

On the other hand, in the beginning stage of printing, if the first atmosphere temperature T1 is lower than the predetermined temperature T (S11: NO), and if the relative humidity H1 measured by the first sensor 11 is equal to or higher than the predetermined degree of humidity H (S12: YES), the controller 14 sets the rotation speed of the fan 13 at the fourth speed (S64).

Moreover, in the beginning stage of printing, when the first atmosphere temperature T1 is equal to or higher than the predetermined temperature T (S11: YES), the controller 14 sets the rotation speed of the fan 13 at the fourth speed (S64).

According to the second modified example, the benefits achievable from the embodiment described above may be substantially achieved.

7. Reference Embodiment

Figure 12:
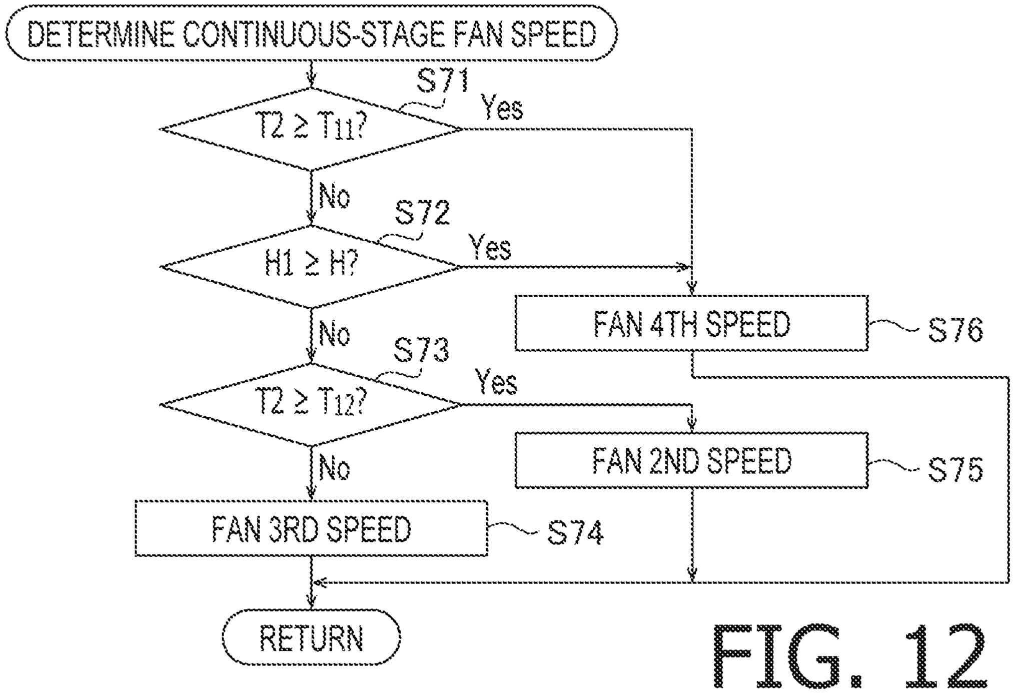
FIG. 12 is a flowchart to illustrate a flow of setting a beginning-stage rotation speed of the fan in a reference embodiment.

Next, with reference to FIG. 12, a reference embodiment will be described below. In the description of the reference embodiment, items and processes that are identical to those in the embodiment described above will be referred to by the same reference signs, and description of those will be herein omitted.

In the reference embodiment, while printing continues, the controller 14 may set the rotation speed of the fan 13 based on at least one of the second atmosphere temperature T2 and the relative humidity H1 measured by the first sensor 11.

In particular, when the rotation speed of the fan 13 is set in the beginning stage of printing (S1) (see FIG. 5), if the second atmosphere temperature T2 is lower than a predetermined temperature $T_{11}$ (S71: NO), if the relative humidity H1 measured by the first sensor 11 is lower than the predetermined degree of humidity H (S72: NO), and if the second atmosphere temperature T2 is lower than a predetermined temperature $T_{12}$ (S73: NO), the controller 14 may set the rotation speed of the fan 13 at the third speed (S74).

The predetermined temperature $T_{11}$ may be, for example, 36 degrees C. The predetermined degree of humidity H in the reference embodiment may be, for example, 55%. The predetermined temperature $T_{12}$ may be, for example, 20 degrees C.

Meanwhile, if the second atmosphere temperature T2 is lower than the predetermined temperature $T_{11}$ (S71: NO), if the relative humidity H1 measured by the first sensor 11 is lower than the predetermined degree of humidity H (S72: NO), and if the second atmosphere temperature T2 is equal to or higher than the predetermined temperature $T_{12}$ (S73: YES), the controller 14 may set the rotation speed of the fan 13 at the second speed (S75).

On the other hand, if the second atmosphere temperature T2 is lower than the predetermined temperature $T_{11}$ (S71: NO), and if the relative humidity H1 measured by the first sensor 11 is equal to or higher than the predetermined degree of humidity H (S72: YES), the controller 14 may set the rotation speed of the fan 13 at the fourth speed (S76).

Moreover, if the second atmosphere temperature T2 is equal to or higher than the predetermined temperature $T_{11}$ (S71: YES), the controller 14 may set the rotation speed of the fan 13 at the fourth speed (S76).

II. Second Embodiment

With reference to FIGS. 13-18, a second embodiment of the present disclosure will be described below.

1. Overall Configuration of Image Forming Apparatus 201

Figure 13:
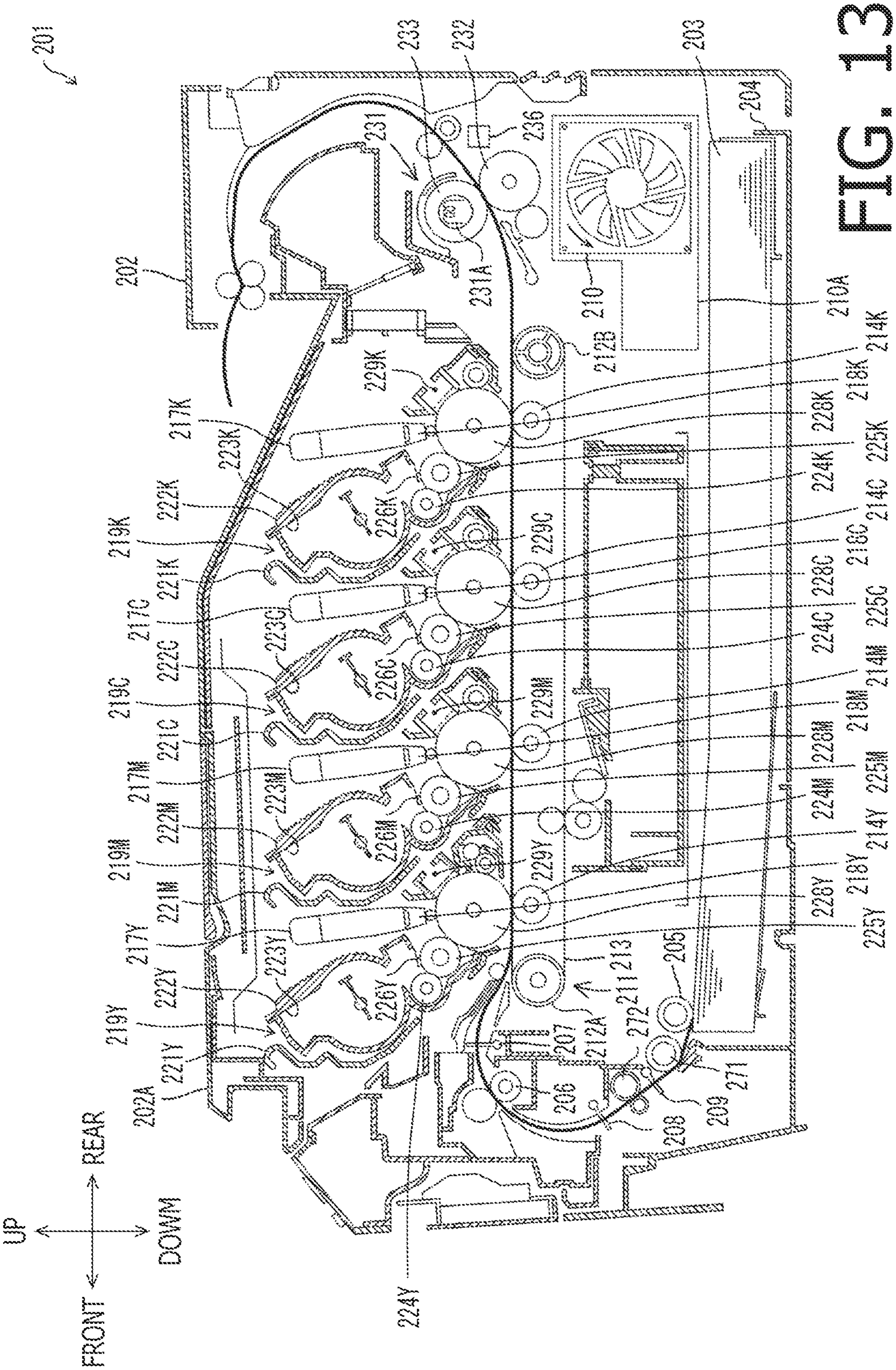
FIG. 13 is an overall cross-sectional view of another image forming apparatus.

FIG. 13 is an overall cross-sectional view illustrating an internal configuration of an image forming apparatus 201 according to the second embodiment of the present disclosure. In the following description, positional terms concerning the image forming apparatus 201, such as "up," "down," "front," "rear," "right," and "left," are based on directions indicated by bidirectional arrows shown in FIGS. 13-15. An up-to-down or down-to-up direction may be called as a vertical direction, a right-to-left or left-to-right direction may be called as a widthwise direction, and a front-to-rear or rear-to-front direction may be called as a front-rear direction.

As shown in FIG. 13, the image forming apparatus 201 is an LED multicolor printer, which may form multicolor images in developing agents in four (4) colors of yellow (Y), magenta (M), cyan (C), and black (K).

Figure 14:
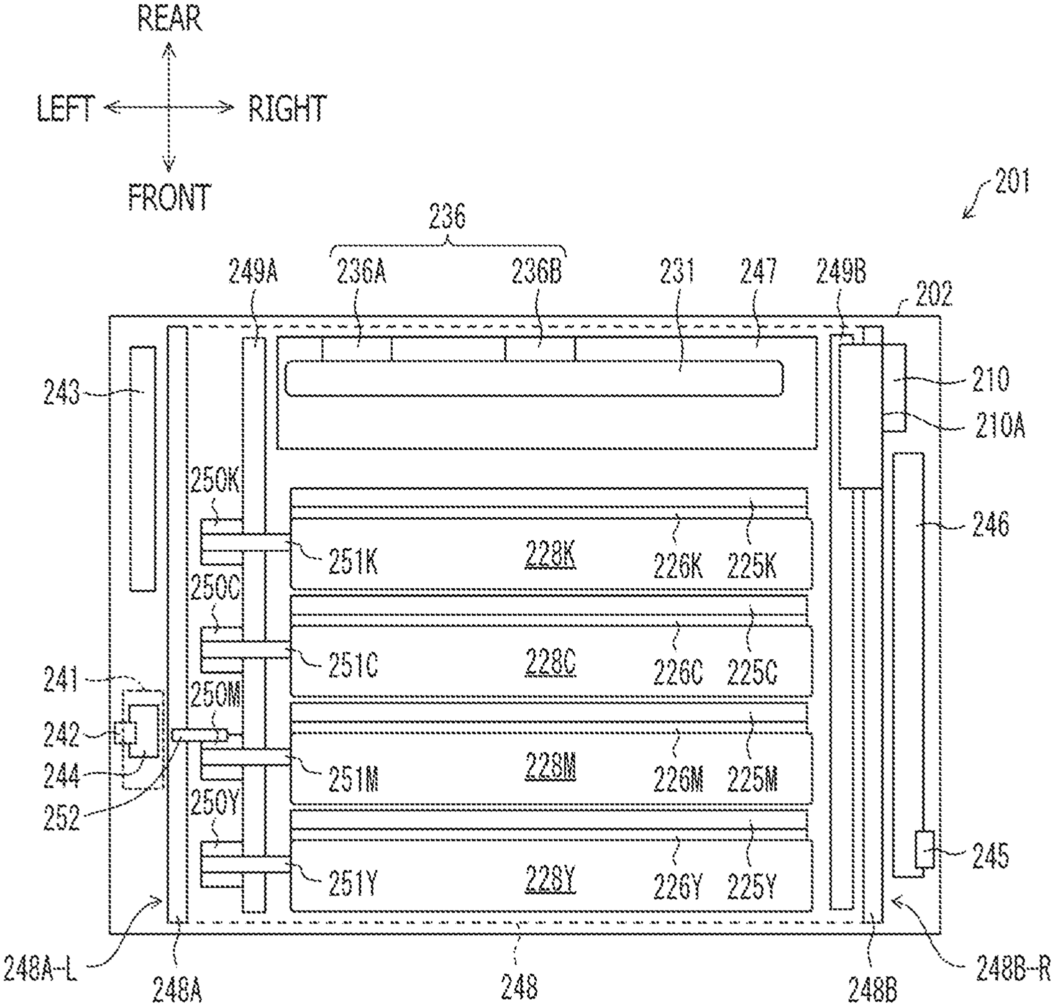
FIG. 14 is a plan view to illustrate an inner configuration in the image forming apparatus.
Figure 16:
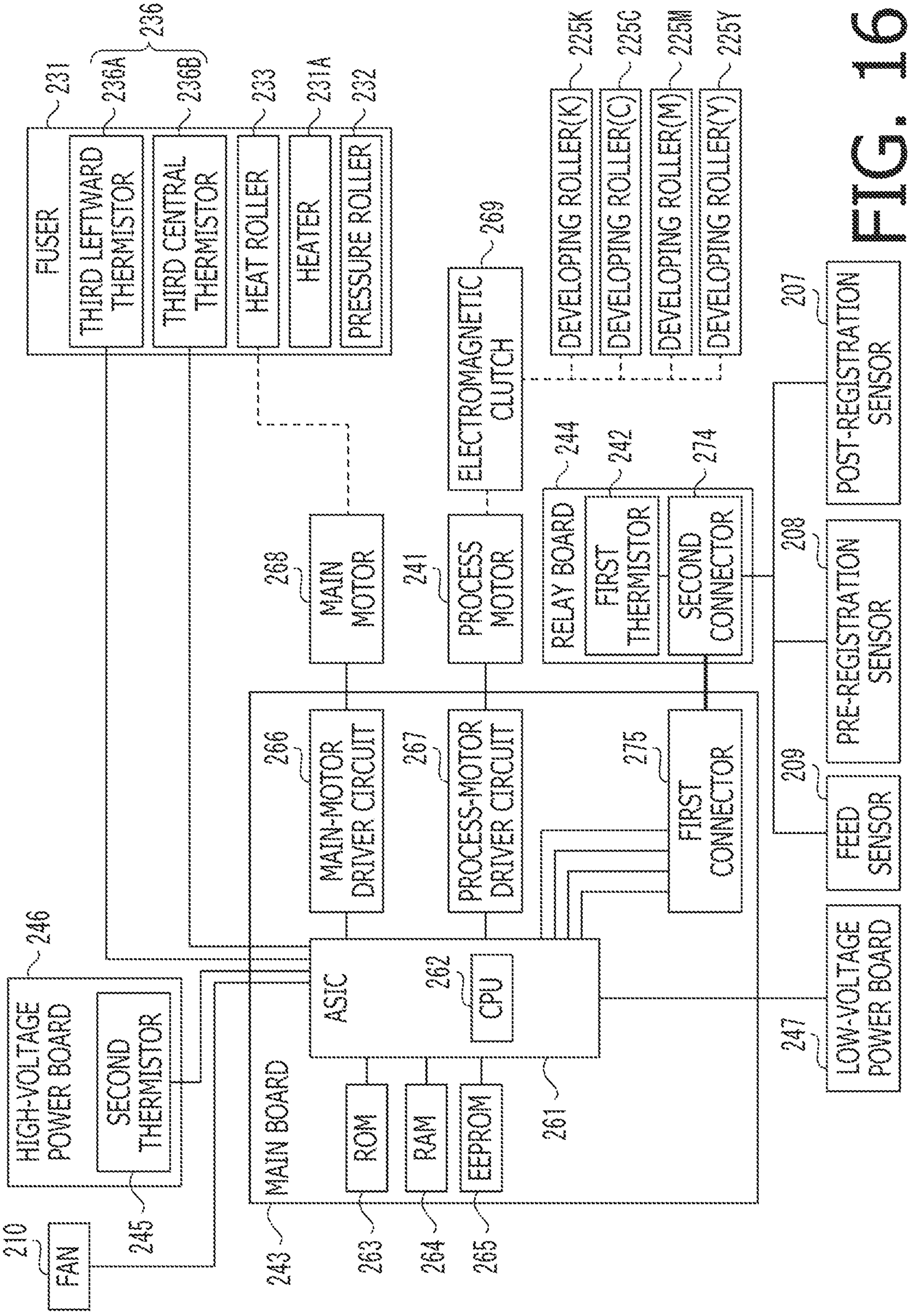
FIG. 16 is a block diagram to illustrate a functional configuration of the image forming apparatus.

In the following description, identical items provided for the multiple colors of yellow (Y), magenta (M), cyan (C), and black (B) may be distinguished by suffixes -Y, -M, -C, and -K, respectively, appended to respective reference numbers. Meanwhile, the identical items may be collectively described in a singular form by a reference number alone without the suffix -Y, -M, -C, or -K. In FIGS. 13, 14, and 16, identical items for the different colors are distinctively denoted by the suffixes -Y, -M, -C, and -K appended to the same reference numbers.

Meanwhile, the image forming apparatus 201 may not necessarily be limited to an LED multicolor printer but may be a laser printer, a facsimile machine, or a so-called multifunction peripheral machine having a printing function and a reading function.

As shown in FIG. 13, the image forming apparatus 201 has a main body housing 202. At a bottom of the main body housing 202, a feeder tray 204, in which sheets 203 may be stacked, is arranged. At an upper-frontward end of the feeder tray 204, a pickup roller 205 is arranged. As the pickup roller 205 rotates, an uppermost one of the sheets 203 stacked in the feeder tray 4 may be fed to a separating roller 271.

The sheets 203 may be separated from one another by the separating roller 271 and a separating pad, which is not shown, and conveyed toward a conveyer roller 272. When each sheet 203 reaches a registration roller 206 staying stationary without rotating, the registration roller 206 may regulate a position of a leading edge of the sheet 203. The sheet 203 may be thereafter conveyed in a conveyer path to a belt unit 211.

Along the conveyer path, a feed sensor 209, a pre-registration sensor 208, and a post-registration sensor 207 are arranged. The feed sensor 209, the pre-registration sensor 208, and the post-registration sensor 207 may detect the sheet 203 passing thereby. The feed sensor 209 is located on a downstream side of the pickup roller 205 and the separating roller 271 in a conveying direction, in which the sheets 203 may be conveyed. The pre-registration sensor 208 is located at a position on a downstream side of the feed sensor 209 and the conveyer roller 272 and on an upstream side of the registration roller 206 in the conveying direction. The post-registration sensor 207 is located at a position on a downstream side of the registration roller 206 and an upstream side of a photosensitive drum 228Y in the conveying direction.

The belt unit 211 includes a belt-supporting roller 212A, which is located frontward, a belt-driving roller 212B, which is located rearward, and an endless belt 213, which is strained around the belt-supporting roller 212A and the belt-driving roller 212B. On an inner side of the belt 213, transfer rollers 214Y-214K are located at positions to face photosensitive drums 228Y-228K, which correspond to four (4) process units 219Y-219K, on one-on-one basis.

The belt-driving roller 212B is, in a state where the belt unit 211 is attached to the main body housing 202, coupled to a process motor 241 (see FIG. 14), which will be described further below, located in the main body housing 202 through a gear assembly (not shown). As a driving force from the process motor 241 drives the belt-driving roller 212B to rotate, the belt 213 may circulate clockwise in FIG. 13, and the sheet 203 placed on an upper surface of the belt 213 may be conveyed rearward.

In an upper area with respect to the belt unit 211, four (4) exposure devices 217Y-217K are arranged along the front-rear direction at positions corresponding to the process units 219Y-219K, respectively. The exposure devices 217Y-217K are supported by a lower surface of the cover 202A and have LED heads 218Y-218K, respectively, in each of which a plurality of LEDs are arranged in line. The exposure device 217 may be controlled based on image data, which composes an image to be formed, to emit light from the LED head 218 at the surface of the photosensitive drum 228, in other words, to scan the photosensitive drum 228 line by line and expose the photosensitive drum 228 to the light.

The process units 219Y-219K include cartridge frames 221Y-221K, respectively, developing cartridges 222Y-222K detachably attached to the cartridge frames 221Y-222K, respectively, photosensitive drums 228Y-228K, respectively, and chargers 229Y-229K, respectively. When the cover 202A is open, the exposure devices 217Y-217K are lifted upward along with the cover 202A, and the process units 219Y-219K may each be detached from or attached to the main body housing 202.

The developing cartridges 222Y-222K include developing-agent container compartments 223Y-223K, respectively, in which developing agents in the colors of Y, M, C, K may be stored. Further, the developing cartridges 222Y-222K have supplying rollers 224Y-224K, respectively, developing rollers 225Y-225K, respectively, and thickness-regulating blades 226Y-226K, respectively, at lower positions thereof.

The developing agent discharged from the developing-agent container compartment 223 may be supplied to the developing roller 225 as the supplying roller 224 rotates and frictionally charged between the supplying roller 224 and the developing roller 225 positively. Further, the developing agent supplied to the developing roller 225 may enter a gap between the thickness-regulating blade 226 and the developing roller 225 as the developing roller 225 rotates and may be further frictionally charged to be carried on the developing roller 225 in a form of an evenly thinned layer.

In a lower area in the cartridge frame 221, the photosensitive drum 228, of which surface is covered with, for example, a positively-chargeable photosensitive layer, and the charger 229, are arranged. When an image is being formed, the photosensitive drum 228 may rotate, and the surface of the rotating photosensitive drum 228 may be positively charged evenly by the charger 229. When the positively charged surface of the photosensitive drum 228 is exposed by the scanning light from the exposure device 217, an electrostatic latent image may be formed on the surface of the photosensitive drum 228.

Meanwhile, the developing agent positively charged and carried on the developing roller 225 may be supplied to the electrostatic latent image on the surface of the photosensitive drum 228, and thereby the electrostatic latent image may be visualized on the photosensitive drum 228 as an image formed in the developing agent. The developing-agent image carried on the surface of the photosensitive drum 228 may be transferred onto the sheet 203 through negative transferring voltage applied to the transfer roller 214 when the sheet 203 is conveyed through a nipping position between the photosensitive drum 228 and the transfer roller 214. The sheet 203 with the developing-agent image transferred thereon may be further conveyed to a fuser 231 having a heater 231A.

The fuser 231 has a heat roller 233 including the heater 231A, a pressure roller 232 to press the sheet 203 against the heat roller 233, and a third thermistor 236, by which the developing-agent image transferred onto the sheet 203 may be thermally fixed. The sheet 203 with the image thermally fixed thereon by the fuser 231 may be conveyed upward and ejected to rest on an upper face of the cover 202A. At a position in proximity to the heat roller 233, the third thermistor 236 is arranged. The third thermistor 236 may detect a temperature of the heat roller 233. Optionally, the heat roller 33 may be replaced with a heating-belt assembly including a nipping plate and a rolling belt, through which the developing-agent image may be fixed on the sheet 203 being conveyed.

The image forming apparatus 201 has a fan 210 to ventilate the air inside the image forming apparatus 201 and a duct 210A having a ventilation port in an area above the feeder tray 204. Inside the image forming apparatus 201, when an image is being formed, heat may be generated in the fuser 231 and the process unit 19. In order to restrain the temperature inside the image forming apparatus 201 from being increased by the heat, the fan 210 may draw the outside air into the image forming apparatus 201 to lower the temperature inside the image forming apparatus 201.

2. Internal Configuration of Image Forming Apparatus

Next, with reference to FIG. 14, an internal configuration of the image forming apparatus 201 will be described.

FIG. 14 is a plan view to illustrate the inner configuration in the image forming apparatus 201. In FIG. 14, while items necessary for explaining the present embodiment are shown, the other items may be omitted.

As shown in FIG. 14, the image forming apparatus 201 has a first metal-plate frame 248A, a second metal-plate frame 248B, a first resin frame 249A, and a second resin frame 249B inside the main body housing 202.

Figure 15:
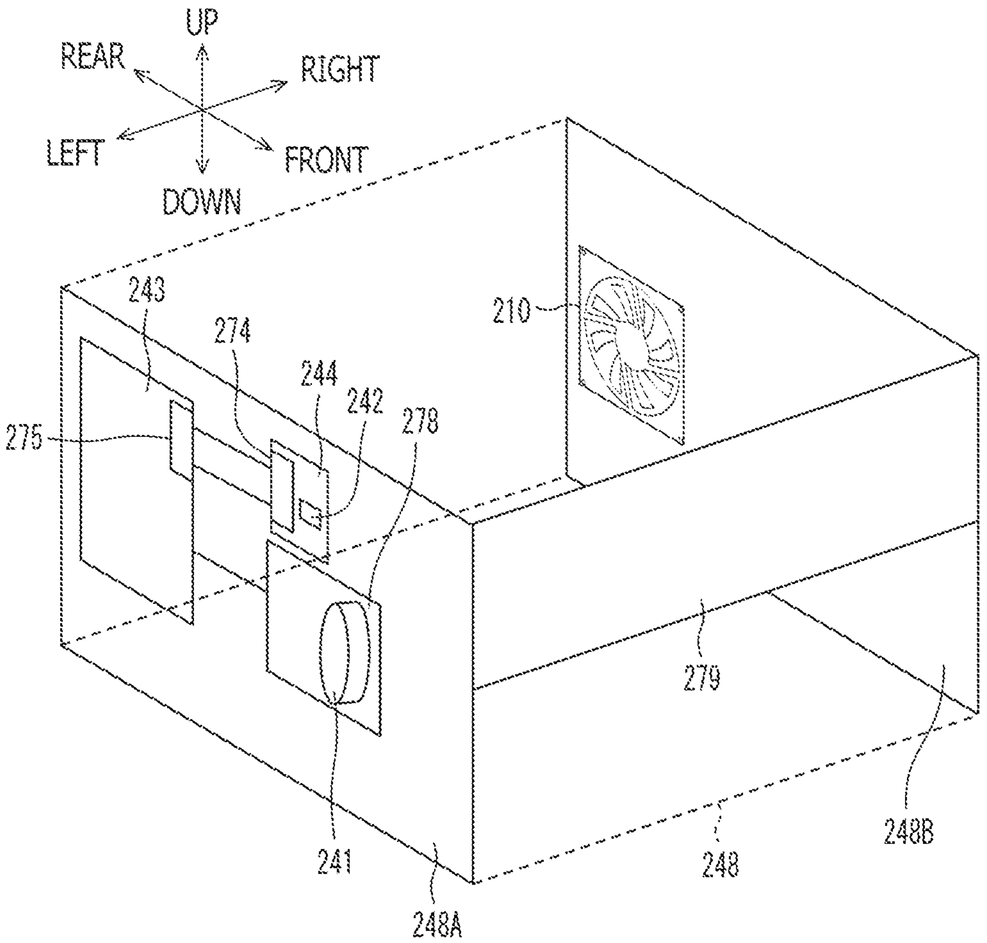
FIG. 15 is an illustrative perspective view of a main body frame in the image forming apparatus.

FIG. 15 is an illustrative perspective view of a main body frame 248. As shown in FIG. 15, the first metal-plate frame 248A, the second metal-plate frame 48B, and a supporting frame 279 form the main body frame 248. The first metal-plate frame 248A and the second metal-plate frame 248B are connected through the supporting frame 279. The first metal-plate frame 248A and the second metal-plate frame 248B may be formed by processing metal plates. However, the first metal-plate frame 248A and the second metal-plate frame 248B may not necessarily be limited to those formed by processing metal plates.

Lines drawn through vertices of the first metal-plate frame 248A and the second metal-plate frame 248B facing each other form a rectangular parallelepiped. In the following paragraphs, a room inside the rectangular parallelepiped may be called as an inside of the main body frame 248, and an outside of the rectangular parallelepiped may be called as an outside of the rectangular parallelepiped. In this arrangement, it may be regarded that the first metal-plate frame 248A forms a leftward face of the rectangular parallelepiped, and the second metal-plate frame 248B forms a rightward face of the rectangular parallelepiped. Moreover, it may be regarded that the supporting frame 279 forms a part of a frontward face of the rectangular parallelepiped.

Meanwhile, as shown in FIG. 15, the main body frame 248 may not provide parts that form a rearward face, an upper face, and a bottom face of the rectangular parallelepiped. However, optionally, the main body frame 248 may provide parts that form the rearward face, the upper face, and/or the bottom face of the rectangular parallelepiped.

As shown in FIG. 14, the first resin frame 249A and the second resin frame 249B are located inside the main body frame 248. The first resin frame 249A and the second resin frame 249B may be made of resin; however, optionally, the first resin frame 249A and the second resin frame 249B made of a material other than resin.

Between the first resin frame 249A and the second resin frame 249B, the developing rollers 225Y-225K, the thickness-regulating blades 226Y-226K, the photosensitive drums 228Y-228K, the fuser 231, the third thermistor 236, and a low-voltage power board 247 are arranged.

On the first resin frame 249A, gears 250Y-250K corresponding to the developing rollers 225Y-225K, respectively, are arranged. The gears 250Y-250K include shafts 251Y-251K, respectively. The shaft 51 is inserted through the first resin frame 249A in the widthwise direction and is attached to the developing roller 225 at a rightward tip end thereof.

The third thermistor 236 includes a third leftward thermistor 236A and a third central thermistor 236B. The third leftward thermistor 236A is located at a position in proximity to a leftward end of the heat roller 33 of the fuser 231. The sheet 203 being conveyed may not pass through the position of the third leftward thermistor 236A in proximity to the leftward end of the heat roller 233; therefore, the third leftward thermistor 236A and the heat roller 233 are in contact with each other regardless of presence or absence of the sheet 203. The third central thermistor 236B is located at a position in proximity to a center of the heat roller 233. The sheet 203 being conveyed may pass through the position of the third central thermistor 236B in proximity to the center of the heat roller 233; therefore, the third central thermistor 236B and the heat roller 233 are separated by a gap to allow the sheet 203 to pass therein.

A temperature of the heat roller 233 may be determined based on a temperature detected by the third leftward thermistor 236A and a temperature detected by the third central thermistor 236B. The temperature of the spot where the sheet 203 passes through and the temperature of the spot where the sheet 203 does not pass through are detected separately, and the temperature of the heat roller 233 may be determined from the separately detected temperatures. Therefore, compared to a case where the temperature of the heat roller 233 is determined by a single temperature, accuracy of detecting the temperature of the heat roller 33 may be more reliable.

The low-voltage power board 247 may supply a low voltage for driving a main board 243, which will be described below, to the main board 243.

On a leftward side 248A-L of the first metal-plate frame 248A, the process motor 241, the main board 243, and a relay board 244 are arranged. In other words, the process motor 241, the main board 243, and the relay board 244 are located on a leftward side on the outside of the main body frame 248.

The process motor 241 may cause a process-motor shaft 252, arranged on the first metal-plate frame 248A, to rotate and transmit a driving force from the process motor 241 to the gear 50. As the gear 50 rotates, the shaft 251 may rotate, and thereby the developing roller 225 may rotate. As the developing roller 225 rotates, the developing agent applied on the developing roller 225 may be flattened by the thickness-regulating blade 226 in the form of a thin layer. Thus, the thickness-regulating blade 226 may regulate the thickness of the developing agent on the developing roller 225.

The main board 243 is a circuit board for controlling components in the image forming apparatus 201. The main board 243 is fixed to an attaching member, which is not shown but is attached to the first metal-plate frame 248A. In other words, the main board 243 is fixed to the first metal-plate frame 248A through the attaching member.

The relay board 244 is connected with the feed sensor 209, the pre-registration sensor 208, and the post-registration sensor 207 through wires and with the main board 43 through a wire. The relay board 244 may output signals from the feed sensor 209, the pre-registration sensor 208, and the post-registration sensor 207 to the main board 243. The relay board 244 is fixed to the attaching member. In other words, the relay board 244 is fixed to the first metal-plate frame 248A through the attaching member.

As shown in FIG. 15, on the main board 243, a first connector 275 is mounted. Meanwhile, on the relay board 244, a second connector 274 is mounted. The first connector 275 on the main board 243 and the second connector 274 on the relay board 244 are connected through a harness, which is now shown. Through the harness, the signals from the feed sensor 209, the pre-registration sensor 208, and the post-registration sensor 207 may be output from the relay board 244 to the main board 243.

The process motor 241 is mounted on a motor board 278. Meanwhile, on the relay board 244, a first thermistor 242 is mounted. In this regard, the first thermistor 242 is located on the leftward side on the outside of the main body frame 248. With the first thermistor 242 mounted on the relay board 244, it may neither be necessary to specifically reserve a spot for the first thermistor 242 nor to prepare a board to specifically support the first thermistor 242. Therefore, a redundant cost for manufacturing the image forming apparatus 201 may be omitted.

Meanwhile, the relay board 244 and the motor board 278 are arranged to align vertically. Moreover, the relay board 244 and the process motor 241 are arranged in proximity to each other. The first thermistor 242 may detect an atmosphere temperature around the process motor 241.

In this regard, it may be desirable that the first thermistor 242 is a device having a structure mountable on a circuit board, on which an electrical circuit is mounted. The first thermistor 242 may be, for example, a chip thermistor mountable on a board, since the chip thermistor may be mounted easily on the relay board 244 being a circuit board.

As shown in FIG. 14, on a rightward side 248B-R of the second metal-plate frame 248B, the fan 210 and a high-voltage power board 246 are arranged. In other words, the fan 210 and the high-voltage power board 246 are located on the rightward side on the outside of the main body frame 248.

The high-voltage power board 246 may supply a high-power voltage including a developing voltage and a charging voltage to the process unit 219. On the high-voltage power board 246, a second thermistor 245 is mounted. The second thermistor 245 may detect an exterior temperature being an atmosphere temperature outside the image forming apparatus 201.

The duct 210A is arranged on the second resin frame 249B and the second metal-plate frame 248B. The fan 210 may generate an airflow from the left toward the right in the image forming apparatus 201.

It may be noted that the first thermistor 242 is located on the leftward side on the outside of the main body frame 248, i.e., on the side opposite to the rightward side where the fan 210 is arranged. In this arrangement, the first thermistor 242 may not be affected by the variable airflow amount. Therefore, in the image forming apparatus 201, the fan 210 may be controlled preferably regardless of the variability of the airflow amount.

3. Functional Configuration of Image Forming Apparatus

FIG. 16 is a block diagram to illustrate a functional configuration of the image forming apparatus 201.

As shown in FIG. 16, on the main board 243, the first connector 275, an ASIC 261, a ROM 263, a RAM 264, an EEPROM 265, a main-motor driver circuit 266, and a process-motor driver circuit 267 are mounted. EEPROM is a registered trademark of Renesas Electronics Corp. The ROM 263 may store programs to conduct operations in the image forming apparatus 201. For example, the ROM 263 may store a controlling program to control the temperature of the heat roller 233 with the heater 231A. The ASIC 261 includes a CPU 262. The CPU 262 may control behaviors of the components, including the process unit 219, related to image forming according the program read from the ROM 263 and write computation results in the RAM 264 and/or the EEPROM 265. The ASIC 261 having a logic circuit may serve to control the image forming as well.

The main-motor driver circuit 266 may drive a main motor 268. The main motor 268 may output a driving force to the heat roller 233 in the fuser 231. As the heat roller 233 is driven to rotate, the pressure roller 232 may be rotated by the rotation of the heat roller 233.

The process-motor driver circuit 267 may drive the process motor 241. The process-motor driver circuit 267 may cause the process motor 241 to drive the developing roller 225 and the photosensitive drum 228.

An electromagnetic clutch 269 may switch transmission and disconnection of the driving force from the process motor 241 to the developing roller 225K.

The CPU 262 may control the heater 231A to increase the temperature of the heat roller 233 in the fuser 231 to an aimed temperature. Moreover, the CPU 262 may conduct a fan-controlling operation.

4. Estimated Temperature of Thickness-Regulating Blade

The image forming apparatus 201 forming an image may generate heat in, for example, the fuser 231. As the temperature of the fuser 231 rises, a temperature of the thickness-regulating blade 226, in particular, a temperature of the thickness-regulating blade 226K closest to the fuser 231 among the thickness-regulating blades 226Y-226K may rise. If the temperature of the thickness-regulating blade 226K rises excessively, the developing agent on the developing roller 225K fused by the heat of the thickness-regulating blade 226K may be solidified on the thickness-regulating blade 226K. With the solidified developing agent staying on the thickness-regulating blade 226K, the surface of the developing roller 225K may be roughened, and the printed image may be roughened.

In order to avoid roughness in the printed image, it is necessary to administer the temperature of the thickness-regulating blade 226K properly. In particular, the thickness-regulating blade 226K located closest to the fuser 231 may be affected by the heat easily. Therefore, it may be important to specifically administrate the temperature of the thickness-regulating blade 226K.

In this regard, estimation formulas, by which the temperature of the thickness-regulating blade 226K may be estimated based on information within the image forming apparatus 201, are herein suggested.

It may be noted that the thickness-regulating blade 226K among the thickness-regulating blades 226Y-226K may be administered specifically in the reason that the thickness-regulating blade 226K is located closest to the fuser 231. However, the thickness-regulating blade 226 to be administered specifically may not necessarily be limited to the thickness-regulating blade 226K. For example, if the thickness-regulating blade 226C is located closest to the fuser 231, the thickness-regulating blade 226C may be the thickness-regulating blade 226 to be administered specifically.

The following two (2) estimation formulas for estimating the temperature of the thickness-regulating blade 226K are suggested.

$$Tb=a1*T1+c1*Rm \qquad \text{Estimation Formula (1):}$$

The sign Tb represents an estimated temperature (degrees C.) of the thickness-regulating blade 226K, the sign T1 represents the atmosphere temperature detected by the first thermistor 242, and the sign Rm represents a number of rotations of the process motor 241 per unit time. The signs a1 and c1 represent constant numbers.

$$Tb=a2*T1+b2*Th+c2*Rm+d2*T2+e2 \qquad \text{Estimation Formula (2):}$$

The sign Tb represents an estimated temperature (degrees C.) of the thickness-regulating blade 226K, the sign T1 represents the atmosphere temperature detected by the first thermistor 242, the sign Th represents a temperature of the fuser 231, the sign Rm represents the number of rotations of the process motor 241 per unit time, and the sign T2 represents the atmosphere temperature detected by the second thermistor 245. The signs a2, b2, c2, d2, and e2 represent constant numbers.

The estimation formula (1) and the and the estimation formula (2) were derived from results of actual experiments by multiple regression analysis. Meanwhile, the estimation formulas (1) and (2) may work appropriate in a normal condition to normally use the image forming apparatus 201, but the constant numbers a1, c1, a2, b2, c2, d2, and e2 may need be modified under a condition where, for example, the image forming apparatus 201 may be used in an environment in an extremely high temperature.

Either the estimation formula (1) or the estimation formula (2) may be selectively used depending on the estimated temperature (degrees C.) of the thickness-regulating blade 226K after the CPU 262 starts the fan controlling operation. In other words, in order to improve accuracy of the estimation, the estimation formula (1) or (2) may be selected based on a determination whether the temperature of the thickness-regulating blade 226K is equal to or higher than a predetermined temperature. The method to select the estimation formula will be described below.

5. Fan-Controlling Operation by CPU

Figure 17:
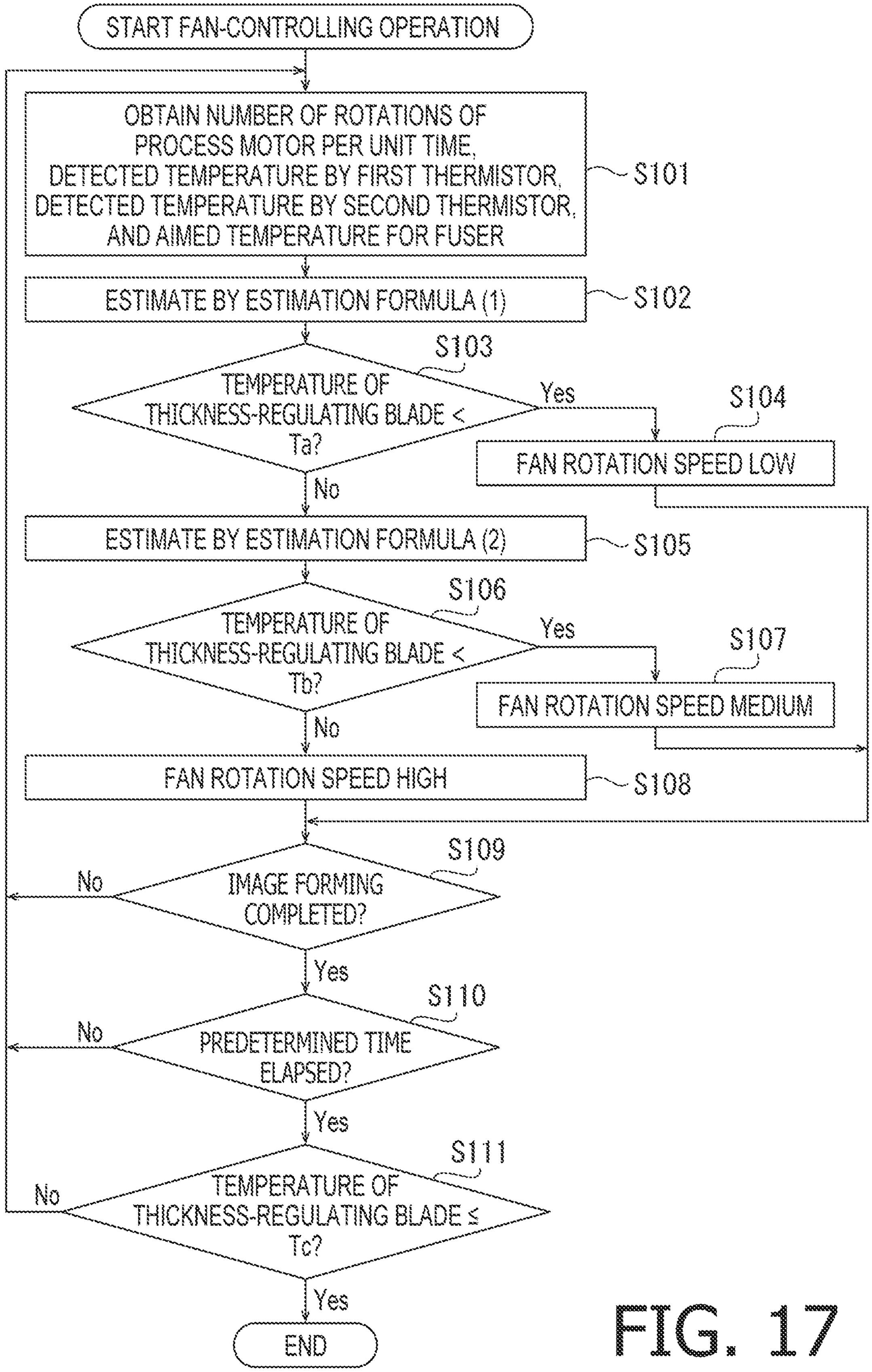
FIG. 17 is a flowchart to illustrate a flow of steps in a fan-controlling operation conducted in the image forming apparatus.

FIG. 17 is a flowchart to illustrate a flow of steps in a fan-controlling operation conducted by the CPU 262.

When the CPU 262 receives a command for image forming, the CPU 262 starts controlling the fan 210. In the following paragraphs, the fan-controlling operation by the CPU 262 will be described.

In S101, the CPU 262 obtains the number of rotations of the process motor 241 per unit time, a detected temperature by the first thermistor 242, a detected temperature by the second thermistor 245, and an aimed temperature for the fuser 231. The detected temperature by the first thermistor 242 is an atmosphere temperature around the first thermistor 242 detected by the first thermistor 242. The detected temperature by the second thermistor 245 is an atmosphere temperature around the second thermistor 245 detected by the second thermistor 245. The aimed temperature for the fuser 231 is an aimed temperature for the heat roller 233 prepared in advance. The aimed temperature may be stored in the EEPROM 265 in advance.

Optionally, the CPU 262 may store the number of rotations of the process motor 241 per unit time, the detected temperature by the first thermistor 242, the detected temperature by the second thermistor 245, and the aimed temperature for the fuser 231 obtained in S101 in, for example, the RAM 264.

The aimed temperature for the fuser 231 is in particular the aimed temperature for the heat roller 233, which is detected by the third thermistor 236. Therefore, an additional thermistor to detect the temperature of the fuser 231 may not be needed. Thus, the temperature of the thickness-regulating blade 226K may be estimated efficiently.

In S102, the CPU 262 assigns the number of rotations of the process motor 241 per unit time and the detected temperature by the first thermistor 242 obtained in S101 to the estimation formula (1) and calculates the estimated temperature of the thickness-regulating blade 226K.

In S103, the CPU 262 determines whether the estimated temperature of the thickness-regulating blade 226K estimated in S102 is lower than a first threshold value Ta. If the estimated temperature of the thickness-regulating blade 226K is lower than the first threshold value Ta (S103: YES), the CPU 262 proceeds to S104. If the estimated temperature of the thickness-regulating blade 226K is not lower than the first threshold value Ta (S103: NO), the CPU 262 proceeds to S105. The first threshold value Ta may be, for example, 35 degrees C.

In S104, the CPU 262 sets the rotation speed of the fan 210 at "low," and the fan 210 may rotate at the rotation speed set as "low." While the estimated temperature of the thickness-regulating blade 226K is lower than the first threshold value Ta, the CPU 262 may rotate the fan 210 at the low speed so that the temperature in the image forming apparatus 201 may be lowered moderately.

In S105, the CPU 262 assigns the number of rotations of the process motor 241 per unit time, the detected temperature by the first thermistor 242, the detected temperature by the second thermistor 245, and the aimed temperature for the fuser 231 obtained in S101 to the estimation formula (2) and calculates the estimated temperature of the thickness-regulating blade 226K.

In S106, the CPU 262 determines the estimated temperature of the thickness-regulating blade 226K estimated in S105 is lower than a second threshold value Tb. If the estimated temperature of the thickness-regulating blade 226K is lower than the second threshold value Tb (S106: YES), the CPU 262 proceeds to S107. If the estimated temperature of the thickness-regulating blade 226K is not lower than the second threshold value Tb (S106: NO), the CPU 262 proceeds to S108. The second threshold value Tb is greater than the first threshold value Ta and may be, for example, 40 degrees C.

In S107, the CPU 262 sets the rotation speed of the fan 210 at "medium," and the fan 210 may rotate at the rotation speed set as "medium." The rotation speed set as "medium" is higher than the rotation speed set as "low." While the estimated temperature of the thickness-regulating blade 226K is equal to or higher than the first threshold value Ta and lower than the second threshold value Tb, the CPU 262 may rotate the fan 210 at the medium speed so that the temperature in the image forming apparatus 201 may be lowered more quickly than the fan 210 rotating at the low speed.

In S108, the CPU 262 sets the rotation speed of the fan 210 at "high," and the fan 210 may rotate at the rotation speed set as "high." The rotation speed set as "high" is higher than the rotation speed set as "medium." While the estimated temperature of the thickness-regulating blade 226K is equal to or higher than the second threshold value Tb, the CPU 262 may rotate the fan 210 at the high speed so that the temperature in the image forming apparatus 201 may be lowered more quickly than the fan 210 rotating at the medium speed.

In S109, the CPU 262 determines whether image forming is completed. When image forming is completed (S109: YES), the CPU 262 proceeds to S110. When image forming is not completed (S109: NO), the CPU 262 returns to S101.

In S110, the CPU 262 determines whether a predetermined time period elapsed since completion of image forming. If the predetermined time period has elapsed (S110: YES), the CPU 262 proceeds to S111. If the predetermined time period has not elapsed (S110: NO), the CPU 262 returns to S101.

In S111, the CPU 262 determines whether the estimated temperature of the thickness-regulating blade 226K estimated in S102 is equal to or lower than a third threshold value Tc. If the estimated temperature of the thickness-regulating blade 226K is equal to or lower than the third threshold value Tc (S111: YES), the CPU 262 ends the fan-controlling operation. If the estimated temperature of the thickness-regulating blade 226K is not lower than the third threshold value Tc (S111: NO), the CPU 262 returns to S101. The third threshold value Tc is smaller than the first threshold value Ta.

The CPU 262 may thus conduct the fan-controlling operation.

The process to select the estimation formula to be used in the fan-controlling operation between the estimation formula (1) and the estimation formula (2) may be summarized as below.

If the estimated temperature of the thickness-regulating blade 226K is lower than the first threshold value Ta, the CPU 262 uses the estimation formula (1). On the other hand, if the estimated temperature of the thickness-regulating blade 226K is equal to or higher than the first threshold value Ta, the CPU 262 uses the estimation formula (2).

In other words, the CPU 262 uses the estimation formula (1) as long as the temperature of the thickness-regulating blade 226K estimated by the CPU 262 is lower than the first threshold value Ta. Meanwhile, as the temperature of the thickness-regulating blade 226K rises to be equal to or higher than the first threshold value Ta, the CPU 262 uses the estimation formula (2) in place of the estimation formula (1).

6. Benefits by Image Forming Apparatus

As described above, the CPU 262 may estimate the temperature of the thickness-regulating blade 226K based on the estimation formula (1) or the estimation formula (2). The CPU 262 may control the fan 210 to rotate at one of low, medium, and high speeds depending on the estimated temperature of the thickness-regulating blade 226K. Thereby, the CPU 262 may control the temperature of the thickness-regulating blade 226K while avoiding solidification of the developing agent on the thickness-regulating blade 226K, and the image forming apparatus 201 may form an image on the sheet 203 without being roughened by the solidified developing agent.

Figure 18:
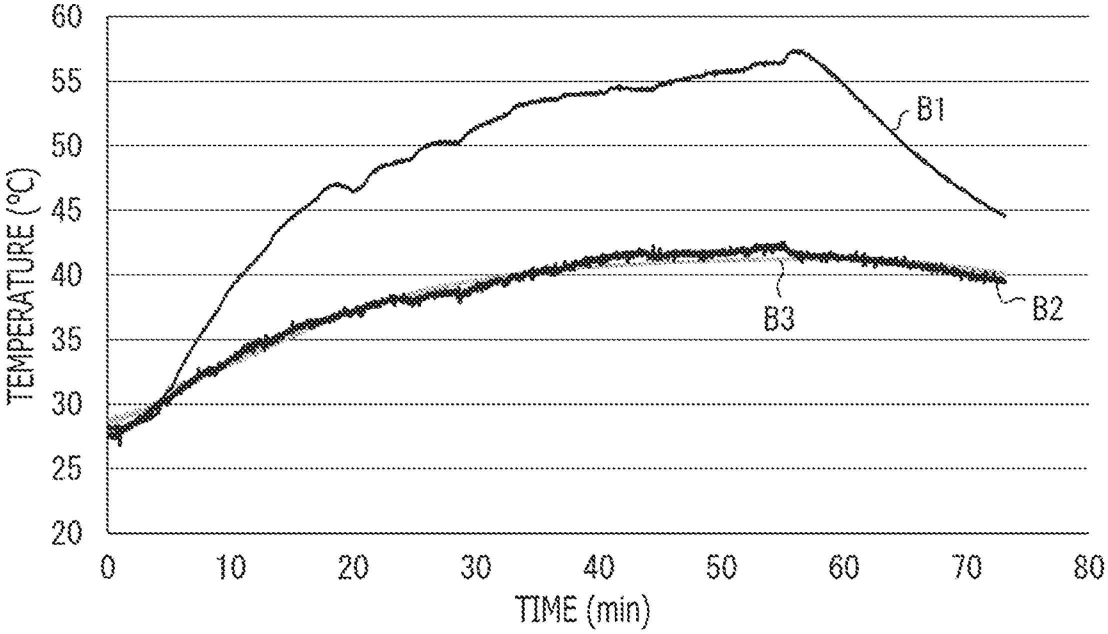
FIG. 18 is a graph to illustrate effectiveness of the fan-controlling operation in the image forming apparatus.

FIG. 18 is a graph to illustrate relationship among a temperature B1 estimated by a known method, a temperature B2 of the thickness-regulating blade 226K actually measured in the image forming apparatus 201, and an estimated temperature B3 of the thickness-regulating blade 226K as estimated based on the estimation formulas (1) and (2). In FIG. 18, a vertical axis indicates temperature, and a horizontal axis indicates operation time of an image forming action. The known method is a method, in which a thermistor is located inside the main body frame 248 of the image forming apparatus 201, and a temperature detected by the thermistor inside the main body frame 248 is determined as the estimated temperature of the thickness-regulating blade. Moreover, FIG. 18 shows an exemplary case, in which an amount of the airflow caused in the image forming apparatus 201 is small, and the thermistor located inside the main body frame 248 is likely to be affected by the temperature change.

As shown in FIG. 18, change in the estimated temperature B3 of the thickness-regulating blade 226K substantially coincides with change in the actually measured temperature B2 of the thickness-regulating blade 226K. Meanwhile, the change in the estimated temperature B1 estimated in the known method differs largely from the changes in the actually measured temperature B2 of the thickness-regulating blade 226K.

From the above observation, it may be regarded that accuracy of estimation based on the estimation formula (1) and the estimation formula (2) is more reliable than the known method.

III. Third Embodiment

Figure 19:
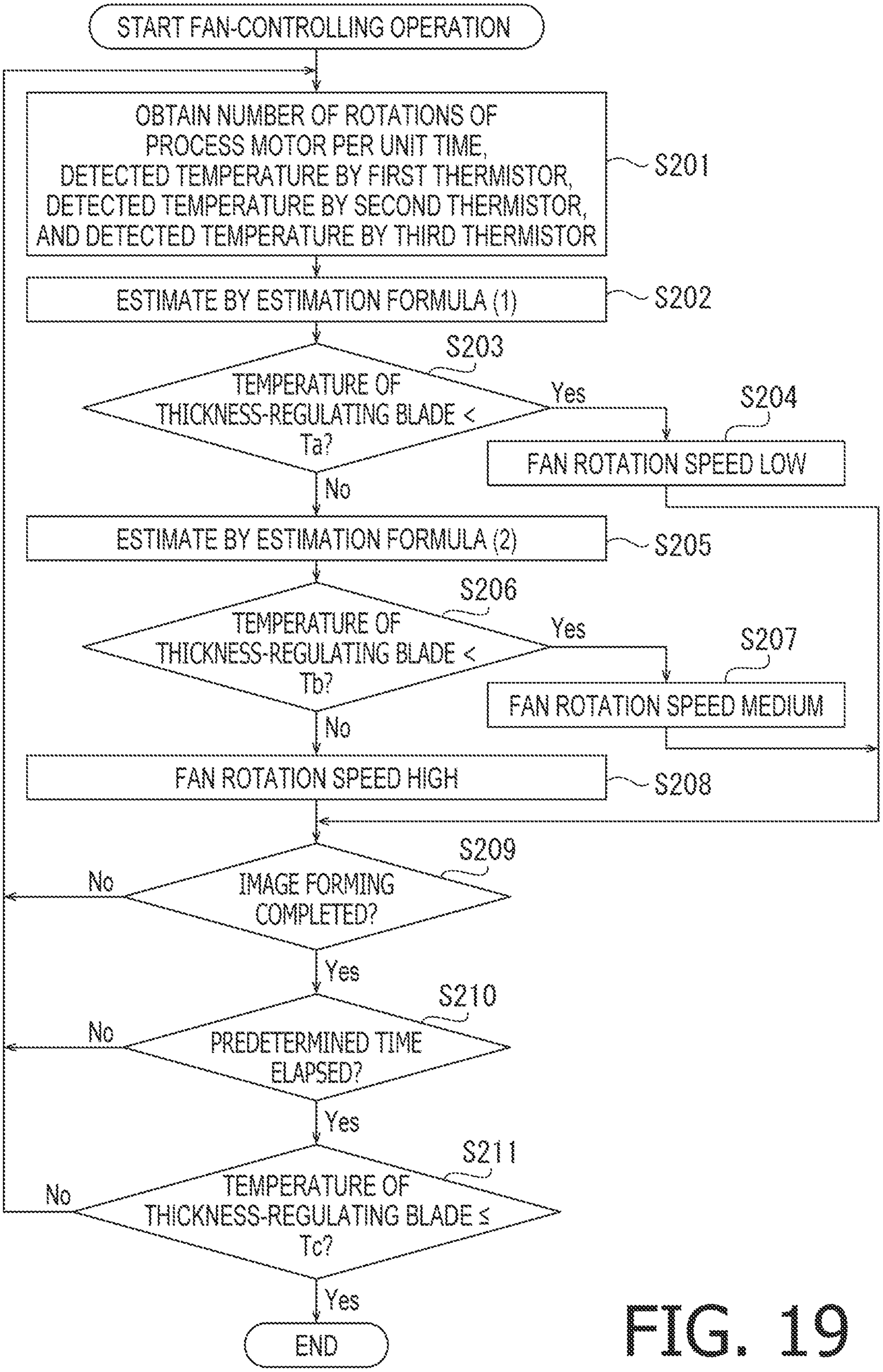
FIG. 19 is a flowchart to illustrate a flow of steps in another fan-controlling operation conducted in the image forming apparatus.

With reference to FIG. 19, a third embodiment of the present disclosure will be described below. In the paragraphs below, items and processes that are identical to those in the second embodiment described above will be referred to by the same reference signs, and description of those will be herein omitted.

In the second embodiment described above, the temperature of the heat roller 233 is regarded as the temperature Th of the fuser 231 and the aimed temperature is the temperature of the heat roller 233, at which the temperature control by the CPU 62 is aimed. In the third embodiment, meanwhile, a temperature to be used in the estimation formula (2) as the temperature of the fuser 231 is the temperature of the heat roller 233 detected by the third thermistor 236.

FIG. 19 is a flowchart to illustrate a flow of steps in a fan-controlling operation conducted by the CPU 262. FIG. 19 is different from the flowchart in FIG. 17 in that, in S201, which replaces S101 in FIG. 17, the CPU 262 obtains the temperature of the heat roller 233 detected by the third thermistor 236 as the temperature of the fuser 231. Meanwhile, processes in S202-S211 in FIG. 19 are substantially the same as those in S102-S111 in FIG. 17.

In the third embodiment, the temperature of the heat roller 233 detected actually by the third thermistor 236 is used as the temperature of the fuser 231, on which the estimation of the temperature of the thickness-regulating blade 226 is based. Therefore, according to the third embodiment, the temperature of the thickness-regulating blade 226 may be estimated accurately.

IV. Modified Examples

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific example of potential alternatives, modifications, or variations in the described invention is provided below.

For example, in the second and third embodiments, the first thermistor 242 is mounted on the relay board 244. However, optionally, the first thermistor 242 may be mounted on the motor board 278. In other words, the spot for the first thermistor 242 may be reserved on the motor board 278, and the first thermistor 242 may be supported by the motor board 278. In this arrangement of the first thermistor 242 mounted on the motor board 278, the benefits achievable from the second and third embodiments may be substantially achieved.

What is claimed is:

1. An image forming apparatus, comprising:

a main body housing including an air outlet opening;

a photosensitive drum;

a fuser configured to thermally fix toner transferred from the photosensitive drum to a sheet on the sheet;

a fan configured to generate an airflow toward the air outlet opening; and a controller configured to, in a continuous stage of printing continuous from a beginning stage:

count a cumulative printed page number being a cumulative number of pages printed by the image forming apparatus, in a case where the cumulative printed page number is smaller than a first page number, control the fan to rotate at a first speed, and in a case where the cumulative printed page number is equal to or larger than the first page number, control the fan to rotate at a second speed, the second speed being higher than the first speed, wherein the air outlet opening is located on an outer wall of the main body housing on one side in a first direction, the fan being configured to discharge air through the air outlet opening, wherein the image forming apparatus further comprises:

a first sensor located in proximity to the outer wall of the main body housing on the one side in the first direction, the first sensor being configured to measure temperature and relative humidity; and a second sensor located on the other side of the main body housing in the first direction, the second sensor being configured to measure temperature in a position closer than the fuser to the photosensitive drum, wherein the controller is configured to:

process the temperature measured by the first sensor as a first atmosphere temperature, and estimate a second atmosphere temperature being a temperature around the photosensitive drum based on the temperature measured by the second sensor.

2. The image forming apparatus according to claim 1, wherein the controller is configured to, in a case where a first time period elapses without conducting a printing process, clear the cumulative printed page number to zero.

3. The image forming apparatus according to claim 1, wherein the controller is configured to, in a case where the cumulative printed page number reaches the first page number in midst of a print job including a plurality of pages being processed, shift a rotation speed of the fan from the first speed to the second speed.

4. The image forming apparatus according to claim 1, wherein the controller is configured to:

in the beginning stage of printing, set a rotation speed of the fan based on the first atmosphere temperature, and in the continuous stage of printing, set a rotation speed of the fan based on the second atmosphere temperature.

5. The image forming apparatus according to claim 1, further comprising:

a developing unit including a developing roller, the developing unit being configured to supply the toner to the photosensitive drum, wherein the second atmosphere temperature is a temperature of an area in proximity to the developing roller.

6. The image forming apparatus according to claim 5, wherein the developing unit further includes a thickness-regulating blade configured to regulate thickness of the toner on the developing roller, wherein the second atmosphere temperature is a temperature of the thickness-regulating blade.

7. The image forming apparatus according to claim 1, wherein the controller is configured to, in the continuous stage of printing:

in a case where the second atmosphere temperature is lower than a first temperature and where the cumulative printed page number is smaller than the first page number, control the fan to rotate at the first speed, in a case where the second atmosphere temperature is lower than the first temperature and where the cumulative printed page number is equal to or larger than the first page number, control the fan to rotate at the second speed, and in a case where the second atmosphere temperature is equal to or higher than the first temperature, control the fan to rotate at the second speed.

8. The image forming apparatus according to claim 7, wherein the controller is configured to, in the continuous stage of printing, in a case where the second atmosphere temperature is equal to or higher than a second temperature, the second temperature being higher than the first temperature, control the fan to rotate at a third speed, the third speed being higher than the second speed.

9. The image forming apparatus according to claim 8, wherein the controller is configured to, in the continuous stage of printing, in a case where the second atmosphere temperature is equal to or higher than a third temperature, the third temperature being higher than the second temperature, control the fan to rotate at a fourth speed, the fourth speed being higher than the third speed.

10. The image forming apparatus according to claim 1, wherein the controller is configured to, in the beginning stage of printing, in a case where the relative humidity measured by the first sensor is equal to or higher than a predetermined degree of humidity, set a rotation speed of the fan to be equal to or higher than the second speed.

11. The image forming apparatus according to claim 10, wherein the controller is configured to, in the beginning stage of printing, in a case where the relative humidity measured by the first sensor is lower than the predetermined degree of humidity and where the first atmosphere temperature is lower than a predetermined temperature, set a rotation speed of the fan to be equal to or higher than the first speed.

12. The image forming apparatus according to claim 1, wherein the first sensor and the second sensor are thermistors.

* * * * *